United States Patent
Yamasaki et al.

(10) Patent No.: US 7,561,185 B2
(45) Date of Patent: Jul. 14, 2009

(54) SHAKE COMPENSATION DEVICE FOR OPTICAL DEVICES USING A MIRROR TO COMPENSATE FOR THE SHAKE

(75) Inventors: Masafumi Yamasaki, Hachioji (JP); Shinji Kaneko, Kokubunjl (JP); Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 587 days.

(21) Appl. No.: 10/198,068

(22) Filed: Jul. 19, 2002

(65) Prior Publication Data

US 2004/0012683 A1    Jan. 22, 2004

(51) Int. Cl.
*H04N 5/228* (2006.01)
(52) U.S. Cl. .............. 348/208.99; 348/208.2
(58) Field of Classification Search ............ 348/208.99, 348/208.2
See application file for complete search history.

(56) References Cited

U.S. PATENT DOCUMENTS

| 5,041,852 | A | * | 8/1991 | Misawa et al. ............. 396/55 |
| 5,418,546 | A | * | 5/1995 | Nakagakiuchi et al. ....... 345/85 |
| 6,464,363 | B1 | * | 10/2002 | Nishioka et al. ........... 359/846 |
| 6,547,406 | B1 | * | 4/2003 | Greenaway et al. ......... 359/845 |

FOREIGN PATENT DOCUMENTS

| JP | 04/211230 | 8/1992 |
| JP | 05-191094 | 7/1993 |
| JP | 08-181094 | 7/1993 |
| JP | 200-267010 | 9/2000 |
| JP | 2000267010 | * 9/2000 |
| JP | 2001-004809 | 1/2001 |

OTHER PUBLICATIONS

Rai-Choudhury, "Handbook of Microlithography, Micromachining and Microfabrication, Vol. 2: Micromachining and Microfabrication," Pie Press © 1997, pp. 484-497.

Vdovin, G., "Quick Focusing of Imagining Optics Using Micromachined Adaptive Mirrors," Optics Communication, vol. 140, Aug. 1, 1997, pp. 187-190.

* cited by examiner

*Primary Examiner*—Sinh N Tran
*Assistant Examiner*—Anthony J Daniels
(74) *Attorney, Agent, or Firm*—Pillsbury Winthrop Shaw Pittman, LLP

(57) ABSTRACT

A shake compensating device for optical devices includes an optical system for forming an image of an object; a reflecting surface placed in the optical path of the optical system, a first substrate having a first electrode, placed adjacent to the reflecting surface; a second substrate fixed to an optical device, placed opposite to the first substrate and having a second electrode at a position opposite to the first electrode; a voltage control circuit for applying voltages across the first electrode and the second electrode, one of which is divided into a plurality of electrodes; and a detecting unit for detecting the shake angle of the optical device. In this case, the voltage control circuit controls the voltages applied across the divided electrodes and the other electrode opposite thereto in accordance with the output of the detecting unit.

4 Claims, 43 Drawing Sheets

REFERENCE VOLTAGE

OUTPUT VOLTAGE OF CONTROL DEVICE

TIMING PULSE TO DIVIDED ELECTRODE

TIMING PULSE TO DIVIDED ELECTRODE

DOTTED LINE:CATHODE TERMINAL OF DIODE
SOLID LINE:OUTPUT VOLTAGE OF DIS.CIRCUIT

VOLTAGE TO DIVIDED ELECTRODE

DOTTED LINE:CATHODE TERMINAL OF DIODE
SOLID LINE:OUTPUT VOLTAGE OF DIS.CIRCUIT

VOLTAGE TO DIVIDED ELECTRODE

35C~38C

50A~50D
30C
PLATE SPRINGS
SHEET-LIKE MEMBER
FRAME MEMBER

CIS-TYPE

TRANS-TYPE

SHAKE COMPENSATION DEVICE FOR OPTICAL DEVICES USING A MIRROR TO COMPENSATE FOR THE SHAKE

BACKGROUND OF THE INVENTION

1. Field of the Invention

This invention relates to a device for compensating a shake caused by hand-held use on photographing in an optical device such as a camera, which refers to a silver halide film camera, a digital camera, a TV camera, a camcorder, or a gastrocamera.

2. Description of the Related Art

Conventional devices for compensating a shake caused by hand-held use on photographing in an optical apparatus such as a camera are available in those in which a variable angle prism placed in front of a photographic lens is used (for example, Japanese Patent Kokai No. Hei 5-181094) and those in which a reflecting mirror placed in front of the photographic lens is used (for example, Japanese Patent Kokai No. Hei 4-211230).

A shake compensating device disclosed in Kokai No. Hei 4-211230 is constructed with a mirror and a mirror supporting mechanism in which the mirror is supported, in front of the photographic lens of a camera, to be tiltable, at an angle of about 45° as a center, with respect to the optical axis of the photographic lens. The device includes the mirror supporting mechanism comprised of a chassis which is fixed at angle of about 45° with the optical axis of the photographic lens in front thereof, a ball interposed between the reverse side of the mirror and the chassis, and spring members pressing the mirror against the chassis with resiliency through the ball; a mirror driving means for tilting the mirror; a shake sensor for detecting the shake of the camera; and a control means for controlling the mirror driving means so that light from an object incident on the photographic side of the camera is stabilized in accordance with the detecting output of the shake sensor.

The mirror driving means has two piezoelectric elements which change a space between the chassis and the mirror. The two piezoelectric elements are two bimorph cells, which are arranged, like cantilevers, parallel with the chassis and perpendicular to each other. The mirror driving means has two power transmitting means driven by the top portions of the two bimorph cells, and the two power transmitting means are arranged at the positions of two bottom angles of a right-angle isosceles triangle, with a center of the ball at a vertex. Moreover, the two power transmitting means are constructed so that power transmitting reference points relative to the mirror practically coincide on a plane parallel with the mirror through the center of the ball.

However, the device using the variable angle prism has the problem that since a ray of light transmitted through the prism is conducted to the photographic lens, image quality is easily deteriorated due to chromatic aberration.

The shake compensating device disclosed in Kokai No. Hie 4-211230 is such that since the displacement of the bimorph cell is mechanically transmitted to the mirror to control the tilt of the mirror, a mechanical mechanism is easily complicated and compensation for large shake is difficult because the amount of displacement is relatively small. Furthermore, the bimorph cell has a hysterisis characteristic, and thus feedback control is required. This brings about complicated control and slow response time. In this publication, it is suggested that a voice coil is used as an actuator, but in this case also, the same defect as in the bimorph cell cannot be obviated.

SUMMARY OF THE INVENTION

It is, therefore, a primary object of the present invention to provide a shake compensating device for optical devices which is simple is structure and quick in response time.

It is another object of the present invention to provide a shake compensating device for cameras which has a sufficient amount of displacement without deteriorating image quality.

The shake compensating device for optical devices according to the present invention includes an optical system for forming an image of an object; a reflecting surface placed in the optical path of the optical system, a first substrate having a first electrode, placed adjacent to the reflecting surface; a second substrate fixed to an optical device, placed opposite to the first substrate and having a second electrode at a position opposite to the first electrode; a voltage control circuit for applying voltages across divided electrodes in which one of the first electrode and the second electrode is divided into a plurality of electrodes and the other electrode opposite thereto; and a detecting means for detecting the shake angle of the optical device. In this case, the voltage control circuit controls the voltages applied across the divided electrodes and the other electrode opposite thereto in accordance with the output of the detecting means.

The shake compensating device for cameras according to the present invention includes a photographic lens for forming an image of an object; a reflecting surface placed at a tilting angle of approximately 45° with the optical axis of the photographic lens on the object side thereof; a first substrate having a first electrode, parallel to the reflecting surface; a second substrate fixed to a camera body, placed opposite to the first substrate and having a second electrode at a position opposite to the first electrode; resilient members supporting the first substrate to the second substrate, displaceable in a vertical direction of the second substrate; a voltage control circuit for applying electrostatic voltages across divided electrodes in which one of the first electrode and the second electrode is divided into a plurality of electrodes and the other electrode opposite thereto; and a detecting means for detecting the shake angle of the camera. In this case, the voltage control circuit controls the voltages applied across the divided electrodes and the other electrode opposite thereto in accordance with the output of the detecting means.

The shake compensating device for cameras of the present invention is preferably designed so that one of the first electrode and the second electrode which is divided into a plurality of electrodes has a first pair of electrodes symmetrical with respect to a first plane passing through the optical axis of the photographic lens and normal to the reflecting surface and a second pair of electrodes symmetrical with respect to a second plane normal to the first plane and passing through a point of intersection of the optical axis of the photographic lens and the reflecting surface, and the voltage control circuit controls the tilt of the reflecting surface in a first direction by a difference between voltages applied across the other of the first electrode and the second electrode which is not divided and the first pair of electrodes and in a second direction by a difference between voltages applied across the other which is not divided and the second pair of electrodes.

The shake compensating device for cameras of the present invention is such that the voltage control circuit controls in time series the voltages across the divided electrodes and other electrodes opposite thereto in accordance with the output of the detecting means.

These and other objects as well as the features and advantages of the present invention will become apparent from the following description of the preferred embodiments when taken in conjunction with the accompanying drawings.

DETAILED DESCRIPTION OF THE PREFERRED EMBODIMENTS

Figure 1:
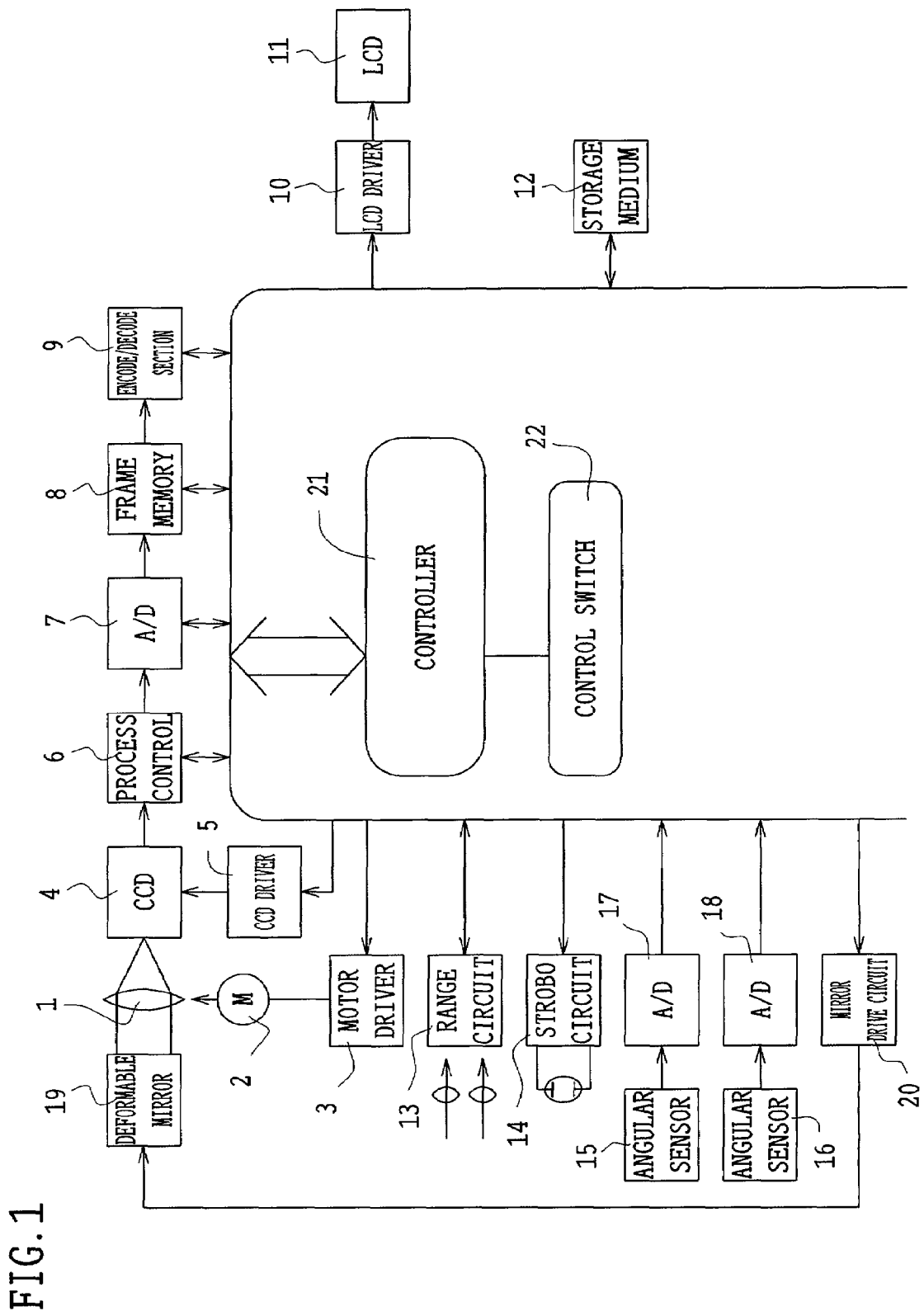
FIG. 1 is a block diagram showing a system construction inside a camera to which the shake compensating device according to the present invention is applied.

FIG. 1 shows a system construction inside a camera to which the shake compensating device of the present invention is applied. The camera includes a photographic lens 1, a motor 2, a motor driver 3, a CCD 4, a CCD driver 5, a process control circuit 6, an A/D converter 7, a frame memory 8, an image encode/decode section 9, an LCD driver 10, an LCD 11, a storage medium 12, a range circuit 13, a stroboscope emitting circuit 14, angular velocity sensors 15 and 16, A/D converters 17 and 18, a deformable mirror 19, a deformable mirror driving circuit 20, a controller 21, and a control switch 22.

The motor 2 is adapted to adjust the focus position of the photographic lens 1. The motor driver 3 is a driving circuit for driving the motor 2. The CCD 4 is an image sensor for converting an image of an object into an electric signal. The CCD driver 5 is a driving circuit for driving the CCD 4. The process control circuit 6 is adapted to make the separation of a color signal, gain control, and gamma correction. The frame memory 8 is adapted to temporarily store a photographed image. The image encode/decode section 9 is a circuit for compressing the photographed image or expanding a received, encoded image signal. The LCD driver 10 is a liquid crystal driving section. The LCD 11 is a liquid crystal displaying section. The storage medium 12 is a memory for storing the photographed image. The range circuit 13 is adapted to detect a signal corresponding to a distance to an object by detecting light transmitted through a lens separated by a preset base length with a housed sensor, upon the principle of triangulation. The angular velocity sensor 15 is a sensor for detecting an angular velocity θp in a vertical direction (the direction of pitch) of the camera. The angular sensor 16 is a sensor for detecting an angular velocity θy in a lateral direction (the direction of yaw) of the camera. The controller 21 is a control device for controlling the entire sequence. The control switch 22 is a release switch or a changeover switch for various modes.

Figure 2:
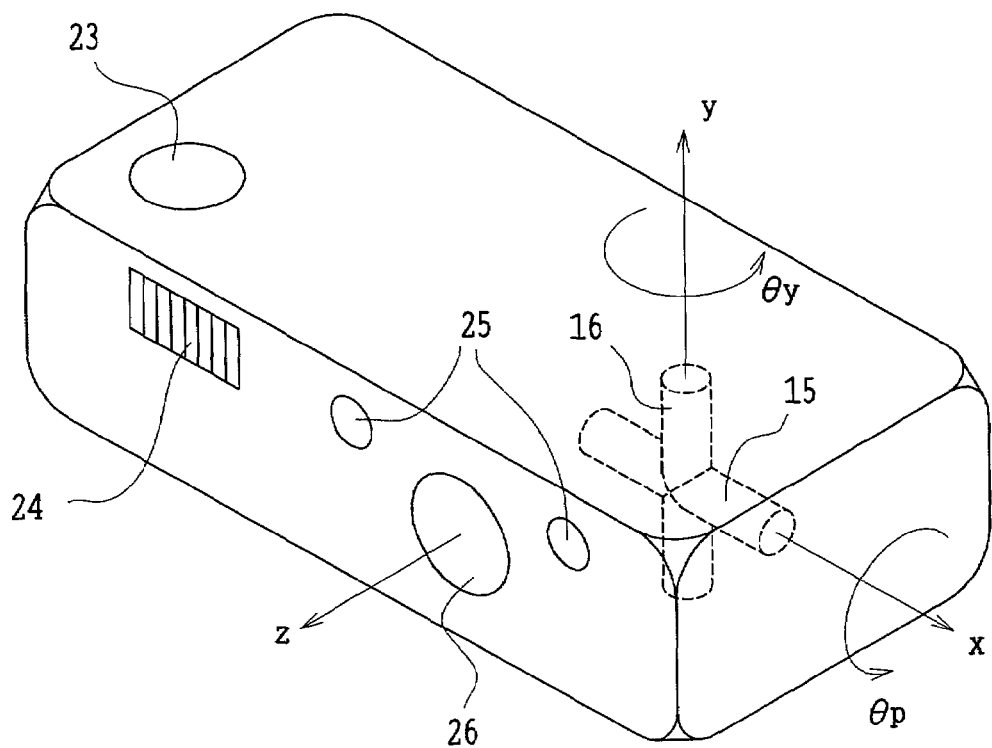
FIG. 2 is a perspective view showing a schematic construction outside the camera of FIG. 1.

FIG. 2 shows the construction outside the camera of FIG. 1 to which the shake compensating device of the present invention is applied. In FIG. 2, reference numeral 23 represents a release button; 24, a stroboscope emission window; 25, AF (autofocus) light-receiving windows; and 26, a photographing light-receiving window. The release button 23 constitutes a part of the control switch 22.

Figure 3:
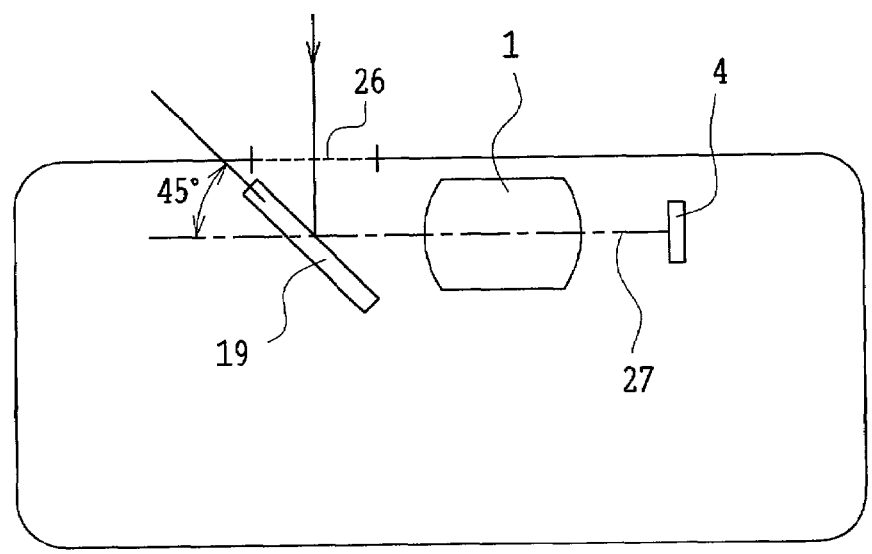
FIG. 3 is a plan view showing essential parts inside the camera of FIGS. 1 and 2.

FIG. 3 shows essential parts inside the camera of FIGS. 1 and 2.

The deformable mirror 19 has a reflecting surface tilted at an angle of approximately 45° with an optical axis 27 of the photographic lens 1 on the object side thereof and conducts light so that the light from the object passing through the photographing light-receiving window 26 is reflected to form an image through the photographic lens 1 at the CCD 4.

Figure 4:
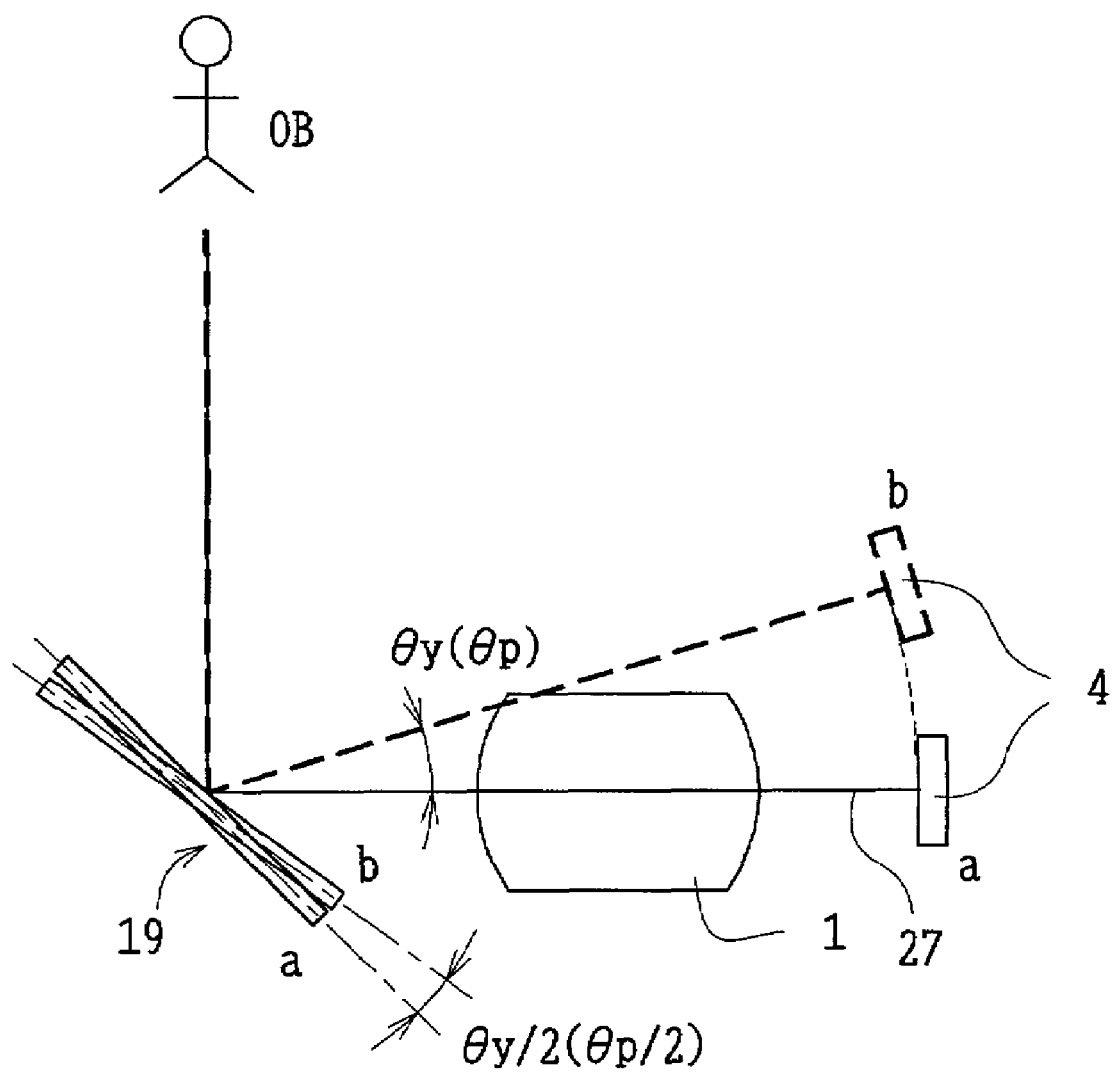
FIG. 4 is an explanatory view of the principle of the shake compensating device according to the present invention.

FIG. 4 illustrates the principle of the shake compensating device, that is, a state where the deformable mirror 19 is tilted in order to form the same object image at the same position on the imaging surface of the CCD when the camera is shaken, for example, in one direction.

When the camera is inclined at the angle θy in the direction of yaw, the mirror surface (reflecting surface) of the deformable mirror 19 is tilted at an angle θy/2 in the same direction. In this case, the image of an object OB, as indicated by a dotted line, is formed the same position on the imaging surface of the CCD 4, and thus the shake of the image in the direction of yaw is not caused. Similarly, even when the camera is inclined at the angle θp in the direction of pitch, the shake of the image in the direction of pitch is not produced if the deformable mirror 19 is tilted at an angle θp/2 in the direction of pitch. Hence, when the mirror surface (reflecting surface) of the deformable mirror 19 is tilted at the angles θy/2 and θp/2 in the directions of yaw and pitch, respectively, with respect to the tilting angles θy and θp of the camera in the directions of yaw and pitch, respectively, the shake of the image caused by hand-held use on photographing of the camera can be compensated. The deformable mirror 19 according to the shake compensating device of the present invention is constructed so that it is driven as mentioned above.

Figure 5:
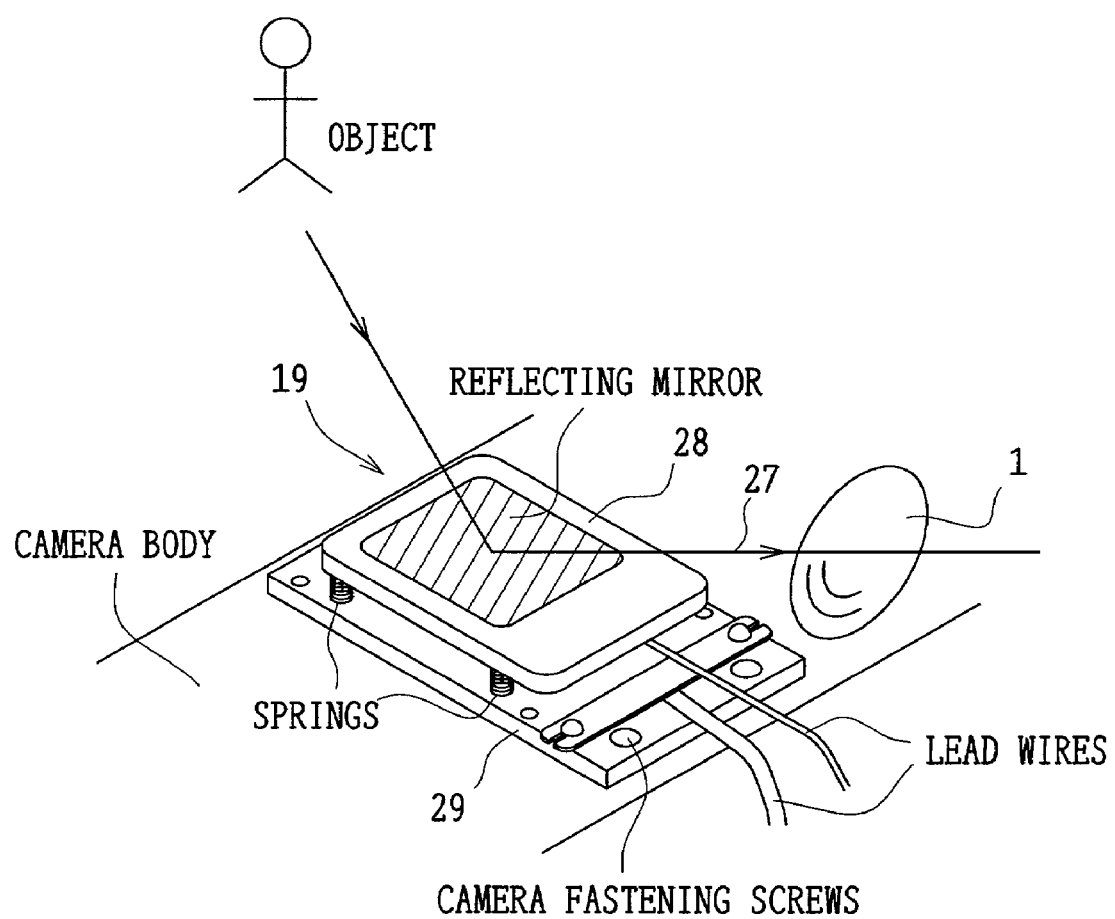
FIG. 5 is a perspective view showing an appearance where a deformable mirror in the shake compensating device of the present invention is mounted to a camera body.
Figure 6:
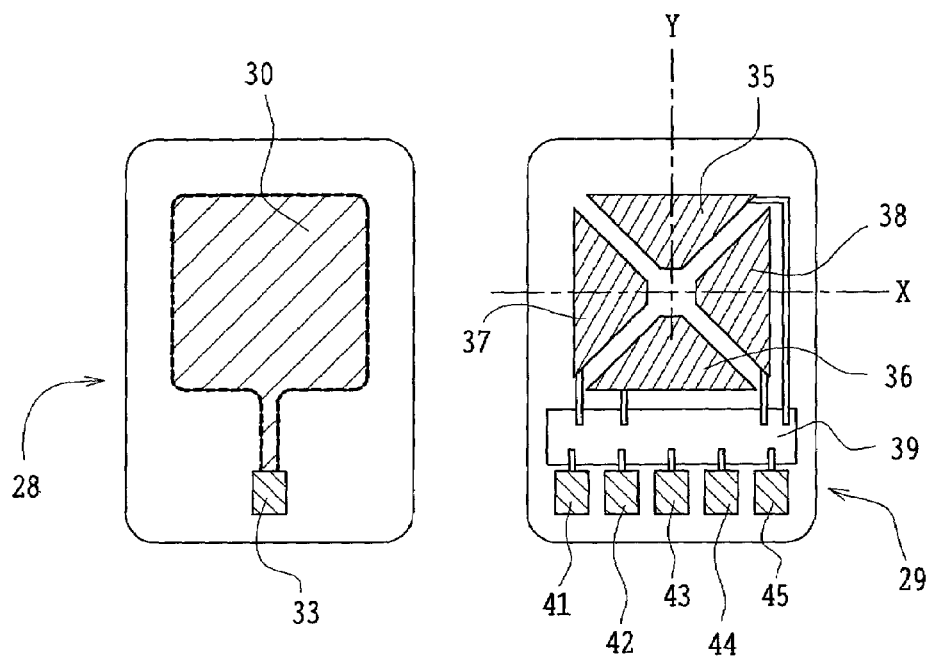
FIG. 6A is a view showing the electrode of the upper substrate of the deformable mirror used in the shake compensating device of the present invention.
FIG. 6B is a view showing the electrodes of the lower substrate of the deformable mirror used in the shake compensating device of the present invention.
Figure 7:
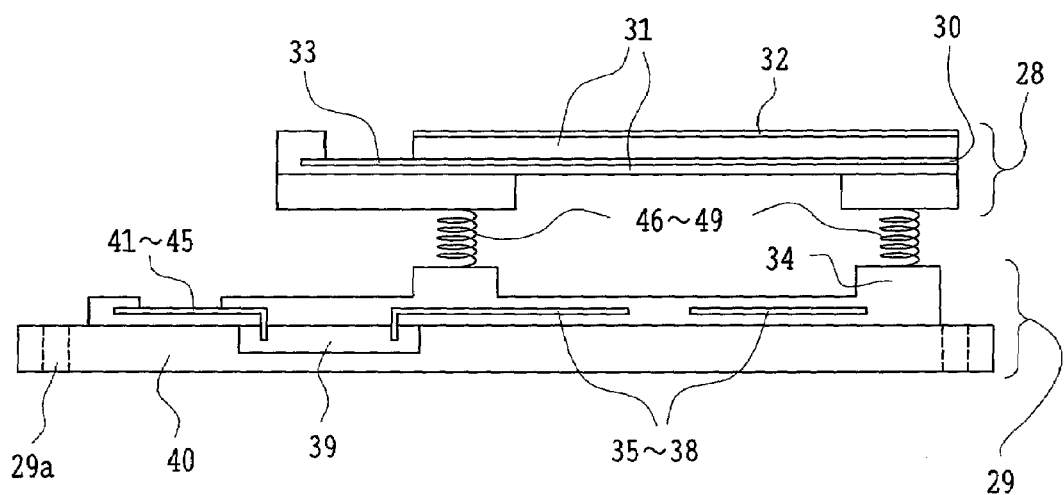
FIG. 7 is a cross-sectional view showing one example of the deformable mirror used in the shake compensating device of the present invention.

Here, a description is given of a specific structure of the deformable mirror according to the shake compensating device with reference to FIGS. 5-7.

The deformable mirror 19, as shown in FIG. 5, includes an upper substrate 28 which is a first substrate having a reflecting surface placed at a tilting angle of approximately 45° with the optical axis 27 of the photographic lens 1 on the object side thereof, a lower substrate 29 which is a second substrate placed opposite to the upper substrate 28 and fastened to the camera body by screws, and springs supporting the upper substrate 28 to be displaceable in a vertical direction on the lower substrate 29.

The upper substrate 28, as shown in FIG. 6A, has an upper electrode 30 which is a first electrode and flexible thin films 31. A reflecting mirror 32 is provided on the surface of the upper substrate 28 so that light incident from the object is reflected and conducted through the photographic lens to the CCD 4 shown in FIGS. 3 and 4.

The upper electrode 30 is placed parallel to the reflecting surface of the reflecting mirror 32. In addition, the upper electrode 30, as shown in FIG. 6A, has a practically rectangular shape and, as shown in FIG. 7, is sandwiched between the flexible thin films 31 so that only an external lead electrode 33 is exposed to the exterior. The external lead electrode 33 is constructed as a connecting terminal with the exterior in the upper electrode 30.

The lower substrate 29, as shown in FIGS. 6B and 7, has a thin film 34, lower electrodes 35, 36, 37, and 38 which are a second electrode divided into four segments, a voltage control circuit section 39, and a semiconductor substrate 40.

The lower electrodes 35-38, as shown in FIG. 6B, are located at the positions opposite to the upper electrode 30 so that the electrodes 35-38 are conducted to the voltage control circuit section 39 through individual connecting lines. The voltage control circuit section 39 is an integrated circuit configured on the semiconductor substrate 40 shown in FIG. 7 and is constructed so that voltages applied to the lower electrodes 35-38 are controlled. External lead electrodes 41, 42, 43, 44, and 45, as shown in FIG. 6B, are connected to the voltage control circuit section 39. The external lead electrodes 41-45 are constructed as terminals for supplying powers or providing control signals to the voltage control circuit section 39.

The lower electrodes 35-38, as shown in FIG. 7, is surrounded by the thin film 34. On the other hand, the external lead electrodes 41-45 are exposed for connection with the exterior.

When a square is drawn so that two of its four sides are parallel to an X axis passing through the middles of the lower electrodes 37 and 38 shown in FIG. 6B and a Y axis passing through the middles of the lower electrodes 35 and 36 and the intersection of its diagonals is located at the intersection of the X axis with the Y axis, springs 46, 47, 48, and 49 are mounted at positions corresponding to apexes of the square, between the upper substrate 28 and the lower substrate 29. The upper substrate 28 is supported to be displaceable through the springs on the lower substrate 29. In this case, a point of the upper substrate 28 opposite to the point of intersection of the X axis and the Y axis of the lower substrate 29 is located to be the center of gravity of the upper substrate 28.

The deformable mirror constructed as mentioned above is mounted in such a way that the lower substrate 29 is fastened by screws to the camera body through mounting holes 29a. The lower electrodes 35 and 36 are located symmetrically about a first plane normal to the reflecting surface (the surface of the reflecting mirror 32) of the upper substrate 28 through the optical axis 27 of the photographic lens 1 shown in FIGS. 3 and 4, with respect to the line connecting their middles (the Y axis of FIG. 6B). The lower electrodes 37 and 38 are located symmetrically about a second plane normal to the first plane and passing through a point of intersection of the optical axis and the reflecting surface, with respect to the line connecting their middles (the X axis of FIG. 6B). The reflecting surface 32 provided on the upper electrode 30 is tilted, together with the upper electrode 30, through the springs 46-49 so that the shake caused by hand-held use in the direction of yaw is compensated by a difference in applied voltage between the upper electrode 30 and the lower electrodes 35 and 36. Similarly, the reflecting surface 32 provided on the upper electrode 30 is tilted, together with the upper electrode 30, through the springs 46-49 so that the shake caused by hand-held use in the direction of pitch is compensated by a difference in applied voltage between the upper electrode 30 and the lower electrodes 37 and 38.

Also, although in the above description the deformable mirror, as shown in FIG. 6B, is constructed so that the second electrode is divided into four segments, it may be constructed so that the first electrode is divided into a plurality of segments and the second electrode is configured as a single electrode.

Figure 8:
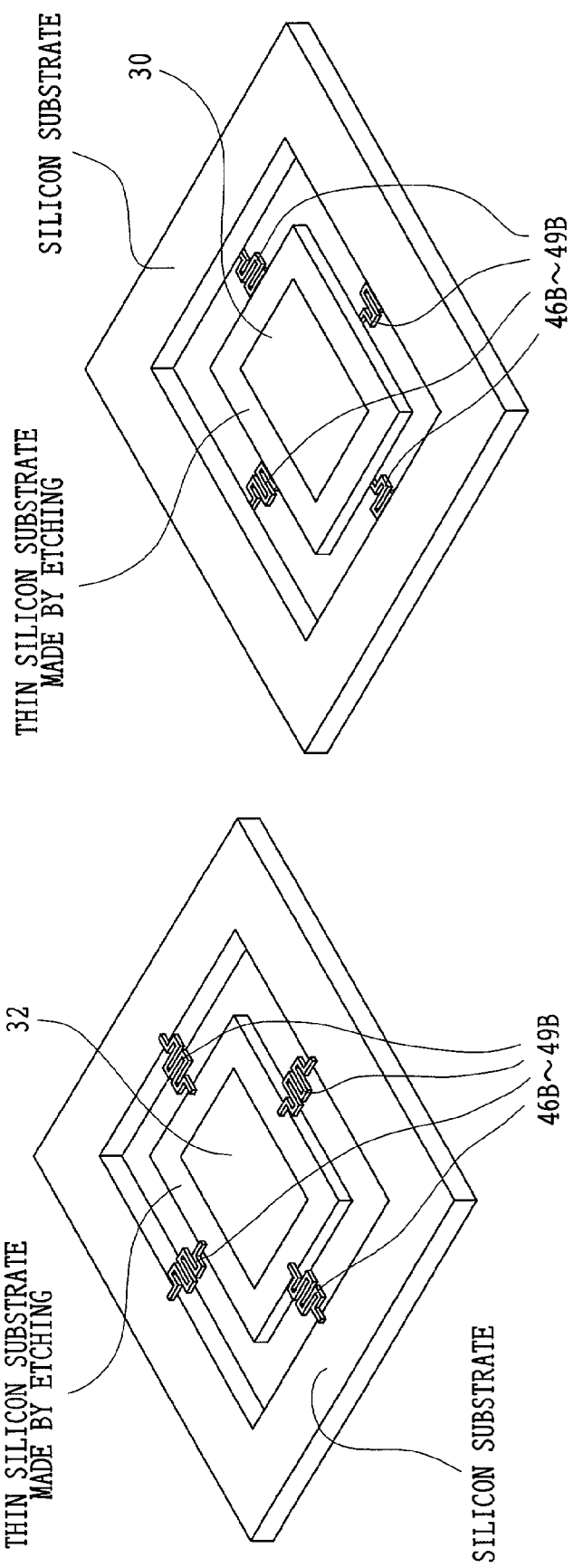
FIG. 8A is a perspective view showing another example of the deformable mirror, viewed from the right side, used in the shake compensating device of the present invention.
FIG. 8B is a perspective view showing the deformable mirror of FIG. 8A, viewed from the reverse side.

Instead of the coil springs 46-49, plate springs 46B, 47B, 48B, and 49B made of polycrystalline silicon, such as those shown in FIGS. 8A and 8B, may be used. Such plate springs can be made thin and easily by using a lithography technique.

Resilient members, such as coil springs and plate springs, may be made with metal, semiconductor, rubber, plastic, or synthetic resin.

Figure 9:
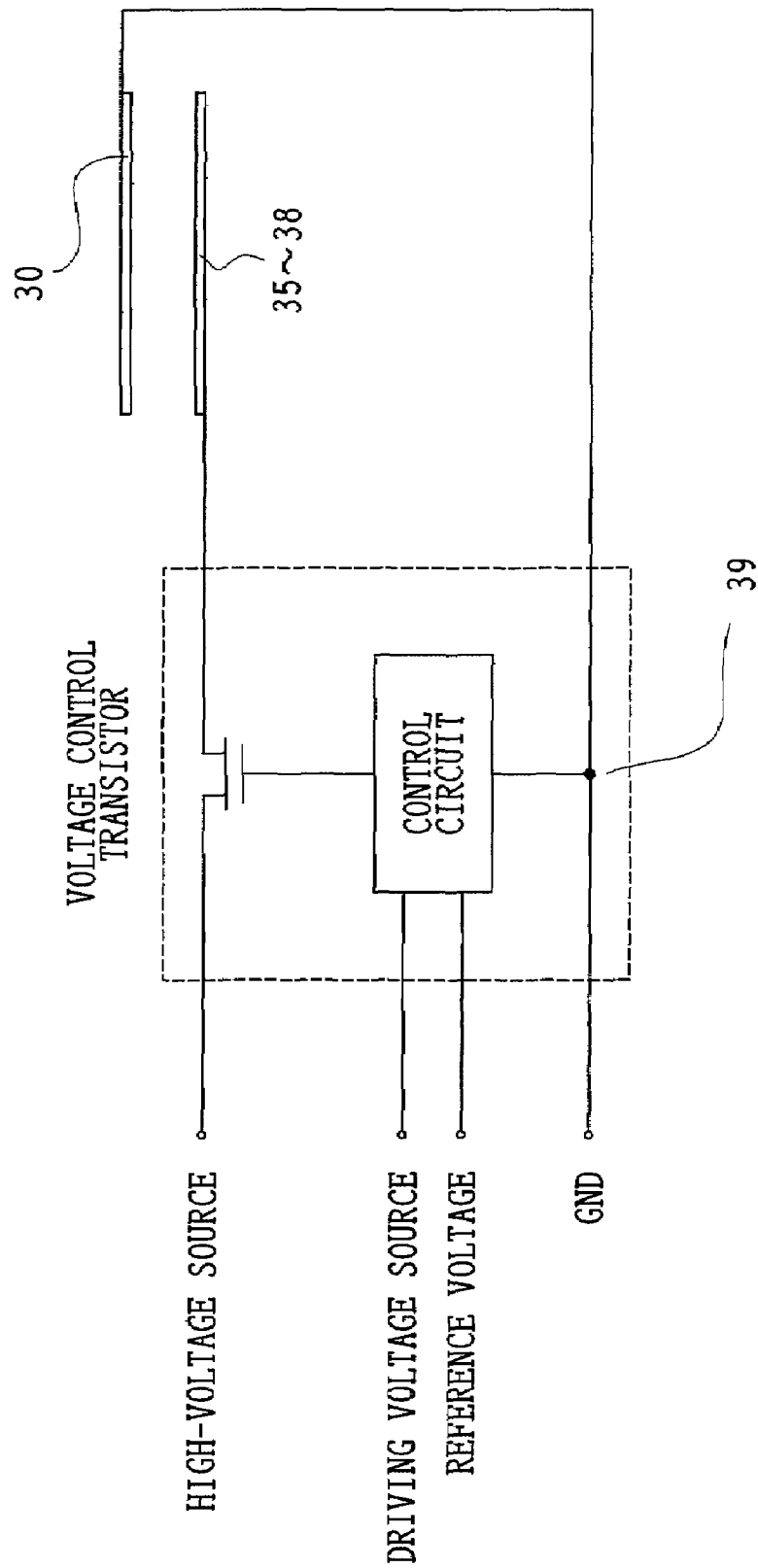
FIG. 9 is a view showing one example of the configuration of a voltage control circuit of the deformable mirror.

FIG. 9 is a block diagram for explaining the operating principle of the voltage control circuit section 39 of the deformable mirror and shows the relationship between the lower electrodes 35-38 which are control electrodes and the upper electrode 30 placed opposite thereto. The voltage is applied across these opposite electrodes, and thereby the shape or position of the upper electrode 30 and the reflecting surface (of the reflecting mirror 32) is changed by its electrostatic attraction. By controlling this applied voltage, the amount of deformation or displacement of the upper electrode 30 and the reflecting surface 32 can be controlled.

In FIG. 9, a high-voltage source is a constant-voltage source of about 100 V, and a reference voltage is a variable voltage of about 5 V. A driving voltage source is a voltage source for driving the control circuit. Each of the high-voltage source, the reference voltage, the driving voltage source, and a GND is applied to one of the external lead electrodes 41-45 of FIG. 6B and is supplied to the voltage control circuit section 39. The voltage control circuit section 39 is provided with a high-resistance voltage control transistor and a control circuit. The voltage control circuit section 39 controls the high-voltage source so that an output voltage corresponding to the reference voltage which is a low voltage can be obtained, and applies voltages to the lower electrodes 35-38 which are control electrodes.

The upper electrode 30, on the other hand, is connected to the GND through the external lead electrode 33 shown in FIG. 6B. The output voltage controlled by the voltage control circuit section 39 is thus applied across the opposite electrodes, and the shape of the reflecting surface is changed by the electrostatic attraction. By changing the reference voltage, the amount of deformation of the upper electrode 30 and the reflecting surface can be controlled.

Here, in the deformable mirror, since a load component is a capacitance component by the opposite electrodes and the voltage applied across the opposite electrodes is a DC voltage, little current flows across the opposite electrodes. Consequently, since the power consumption of the voltage control transistor is minimized, there is no need to use a special radiator, and an ordinary semiconductor device manufacturing process can be used to integrally configure the voltage control transistor and the control circuit on a voltage control substrate. For a device in which it is difficult to configure them on the voltage control substrate, discrete parts can be mounted. Since the voltage control circuit section 39 is constructed integrally with the deformable mirror and thereby the deformable mirror can be driven only by providing the power source and the control signal from the exterior, space saving is afforded and the deformable mirror suitable for compactness can be obtained.

Figure 10:
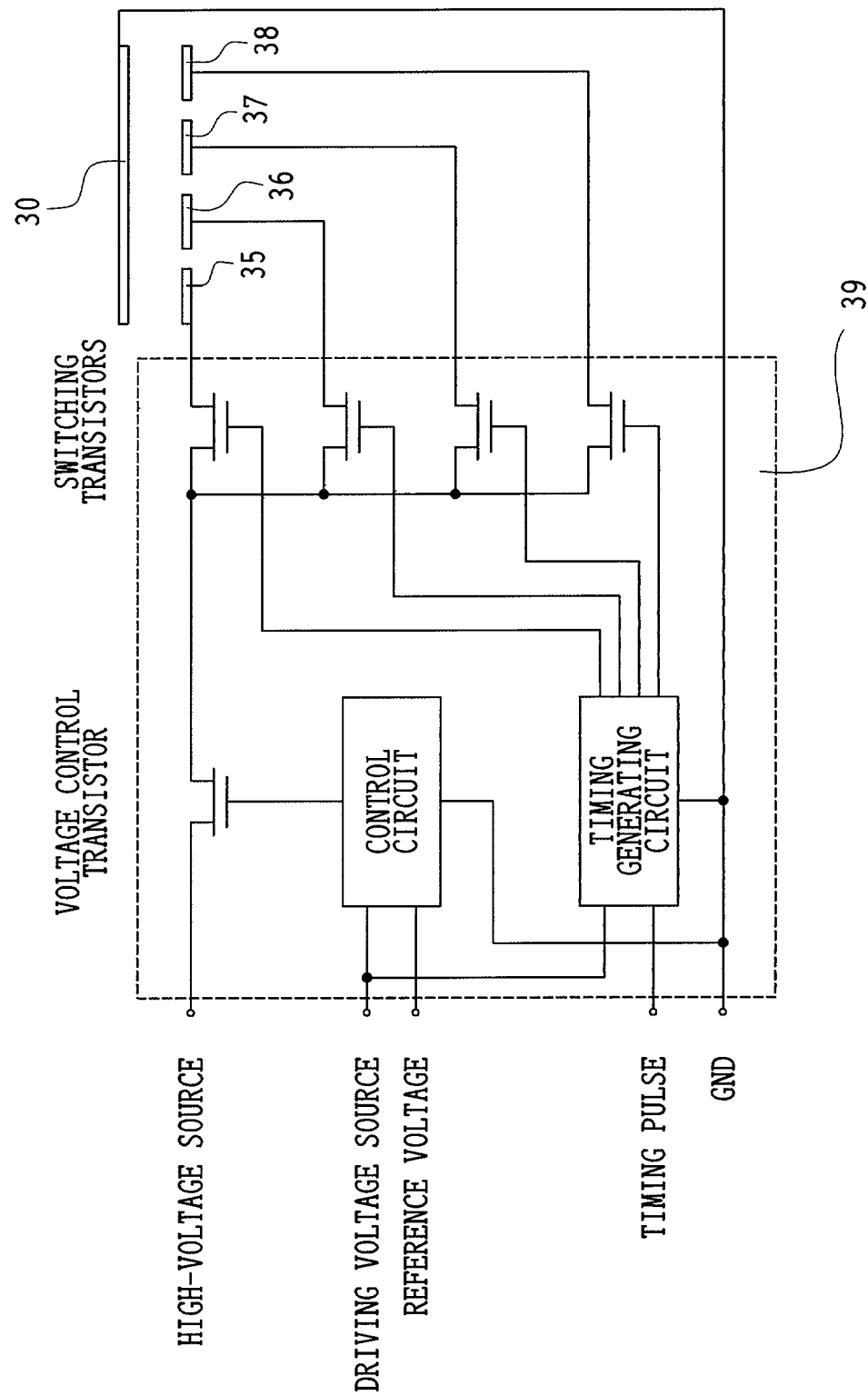
FIG. 10 is a view showing another example of the configuration of the voltage control circuit of the deformable mirror.
Figure 11A:
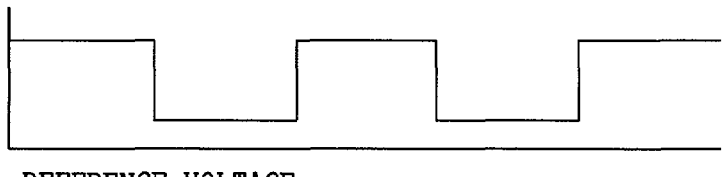
FIGS. 11A, 11B, 11C, 11D, 11E, and 11F are timing charts showing the operations of individual portions of the voltage control circuit of FIG. 10.
Figure 11B:
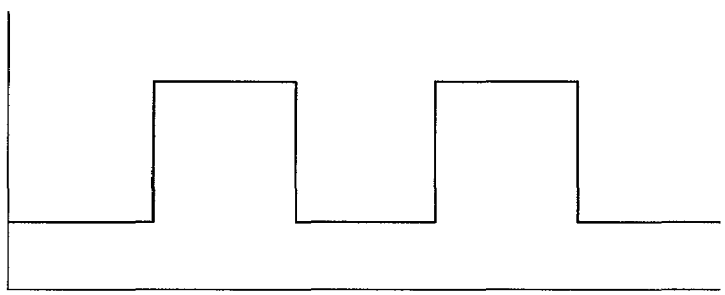
Figure 11C:
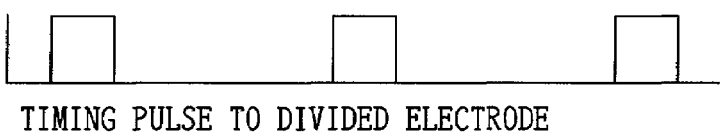
Figure 11D:
Figure 11E:
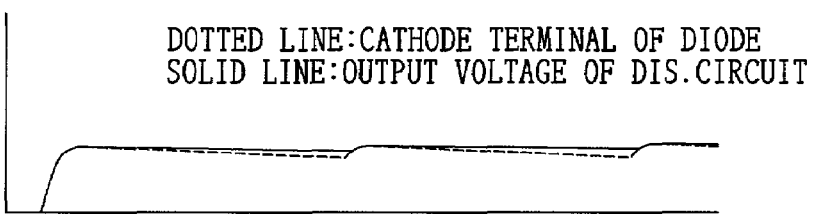
Figure 11F:
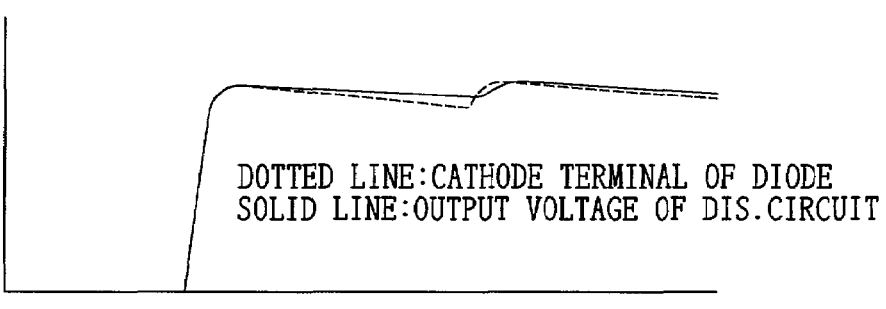

FIG. 10 shows a circuit configuration where the second electrode is divided into a plurality of electrodes 35-38.

In FIG. 10, the high-voltage source, the reference voltage, and the driving voltage source are the same as those shown in FIG. 9. A timing pulse is a pulse voltage synchronized with a change of the reference voltage. Each of the high-voltage source, the reference voltage, the driving voltage source, the timing pulse, and the GND is applied to one of the external lead electrodes and is supplied to the voltage control circuit section 39. The voltage control circuit section 39 includes the high-resistance voltage control transistor, the control circuit, a timing generating circuit, and high-resistance switching transistors.

The reference voltage according to a voltage applied to a given electrode of the divided control electrodes is input and an output voltage is controlled by the voltage control transistor and the control circuit. The timing pulse is input synchronously with this, and the switching transistor corresponding to the control electrode is brought into an on condition by the output of the timing generating circuit. After a constant time, the switching transistor is changed into an off condition, and the connection between the output of the voltage control transistor and the control electrode is cut so that the voltage applied to the control electrode is kept constantly. Whereby, a controlled voltage is applied to the control electrode. The voltage control by the reference voltage and the on-off operation of the switching transistor by the timing pulse are performed in time series, and thereby a given voltage can be applied to each of the divided control electrodes (lower electrodes) 35-38.

Timing charts of the operations of individual portions of the voltage control circuits in this case are shown in FIGS. 11A-11F. In each of these figures, two arbitrary electrodes of the divided electrodes are shown.

Here, as described with reference to FIG. 9, in the deformable mirror, a load component is a capacitance component by the opposite electrodes and the voltage applied across the opposite electrodes is a DC voltage. Therefore, even when the applied voltage of each of the divided control electrodes is controlled in time series, the voltage applied to each electrode can be easily kept constantly. These voltage control circuits are integrally constructed and thereby the deformable mirror that has the control electrode divided into a plurality of segments can be driven only by providing the power source and the control signal from the exterior. In addition, even though the number of division of the control electrode is increased, there is no need to increase the control circuit accordingly, and the voltage can be controlled by a simple change of the timing generating circuit and the extension of the switching transistor. Consequently, space saving is afforded and the deformable mirror suitable for compactness can be obtained.

Figure 12:
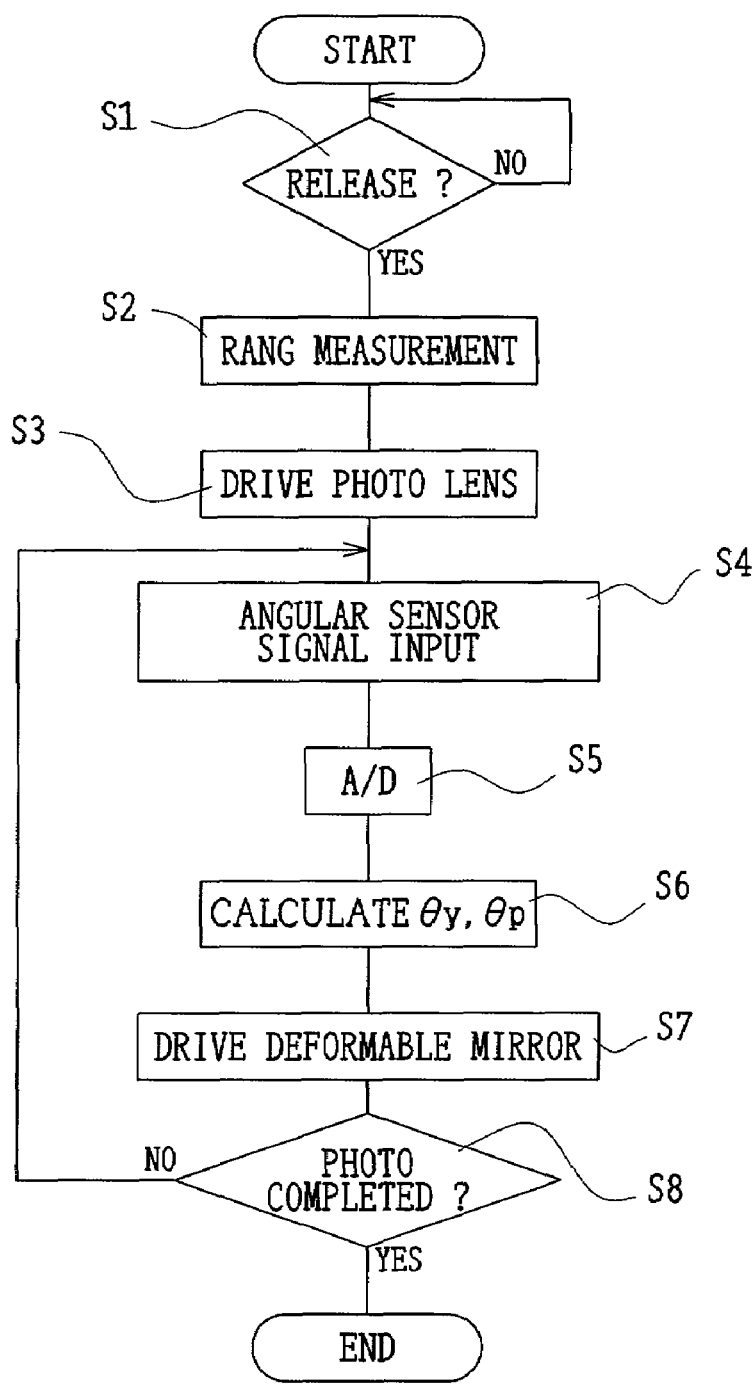
FIG. 12 is a flowchart showing the operations of essential parts of the camera provided with the shake compensating device of the present invention.

Subsequently, reference is made to the operation of the camera, on photographing, provided with the shake compensating device constructed as mentioned above, using FIG. 12.

Operating sequence control to be described below is made through the controller 21 of FIG. 1.

A determination is first made as to whether the release button 23 (FIG. 2) is pushed (Step S1).

When the release button 23 is pushed, a range measurement is made through the range circuit 13 of FIG. 1 (Step S2).

In Step S1, on the other hand, when the release button 23 is not pushed, the procedure of the above determination is repeated. Actually, various controls according to the determination of keyboard entry and the information of the keyboard entry are made, but in FIG. 1, the explanation of these controls is omitted.

The range measurement is made in such a way that light transmitted through a lens separated by a preset base length is detected by a sensor (not shown) housed in the range circuit 13 of FIG. 1, upon the principle of triangulation, and thereby a signal corresponding to a distance to the object is detected.

Next, in accordance with information detected in the range circuit 13, the photographic lens 1 is driven to a focusing position through the motor 2 of FIG. 1 (Step S3). The angular velocities $\theta p$ and $\theta y$ in the directions of pitch and yaw of the camera are detected by the angular velocity sensors 15 and 16 (Step S4). Then, the output values of the angular velocity sensors 15 and 16 are A/D-converted (Step S5) and are integrated to thereby calculate the rotating angles $\theta p$ and $\theta y$ in the directions of pitch and yaw of the camera (Step S6). Subsequently, the deformable mirror 19 is driven, and thereby the reflecting surface of the reflecting mirror 32 is tilted by $\theta y/2$ in the direction of yaw and by $\theta p/2$ in the direction of pitch. Whether photographing is completed is checked (Step S8), and if not, the procedure is returned to Step S4 and this operation procedure is repeated at a high speed until photographing is completed.

By doing so, an image with no blurring is obtained.

In this case, according to the embodiment, the tilt of the reflecting mirror can be controlled by an electrostatic force, and thus the shake of the camera on photographing can be compensated with a simple structure and without deteriorating image quality. Moreover, the deformable mirror can be controlled with a less number of external lead electrodes.

Figure 13:
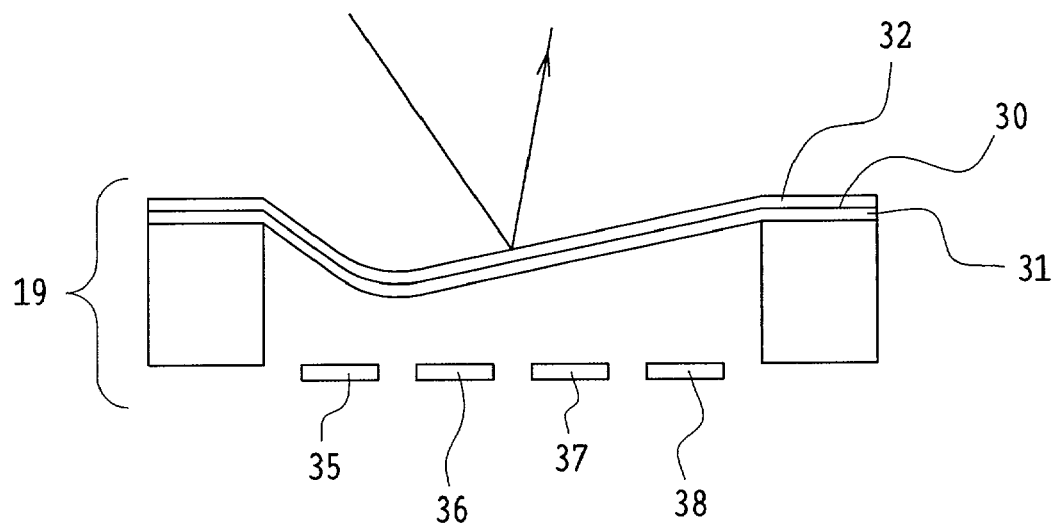
FIG. 13 is a view showing a schematic construction of still another example of the deformable mirror applicable to the shake compensating device of the present invention.
Figure 14:
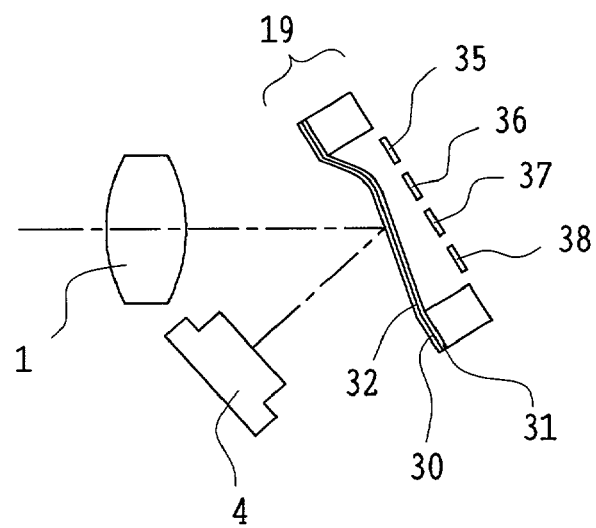
FIG. 14 is an explanatory view showing the case where the deformable mirror of FIG. 13 is incorporated as the shake compensating device of the present invention in an optical device.

Also, in the embodiment shown in FIGS. 5-7, the deformable mirror is constructed so that the springs are interposed between the substrates provided with the upper and lower electrodes. However, as shown in FIG. 13, it may be constructed so that the upper electrode 30 itself that has the flexible thin film 31 and the reflecting film 32 evaporated on the flexible thin film 31 is arbitrarily deformed by electrostatic attractions of the plurality of electrodes 35-38 arranged on the lower side, and as shown in FIG. 14, is deformed to make a preset compensation for the shake of the camera.

In doing so, the construction of optical members becomes simpler, and the reflecting mirror to be deformed or partially deformed can be driven in a non-contact condition.

Figure 15:
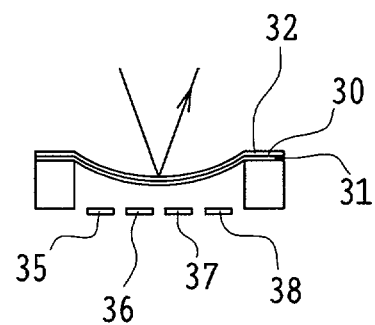
FIG. 15 is an explanatory view showing a deformed state of the mirror in the case where the deformable mirror of FIG. 13 is used as a focusing device in addition to the shake compensating device.

In this case, as shown in FIG. 15, when the mirror surface of the deformable mirror is changed to a concave surface so that focusing and compensation for shake can be achieved simultaneously, the construction of optical members can be made much simpler, which is favorable.

Figure 16:
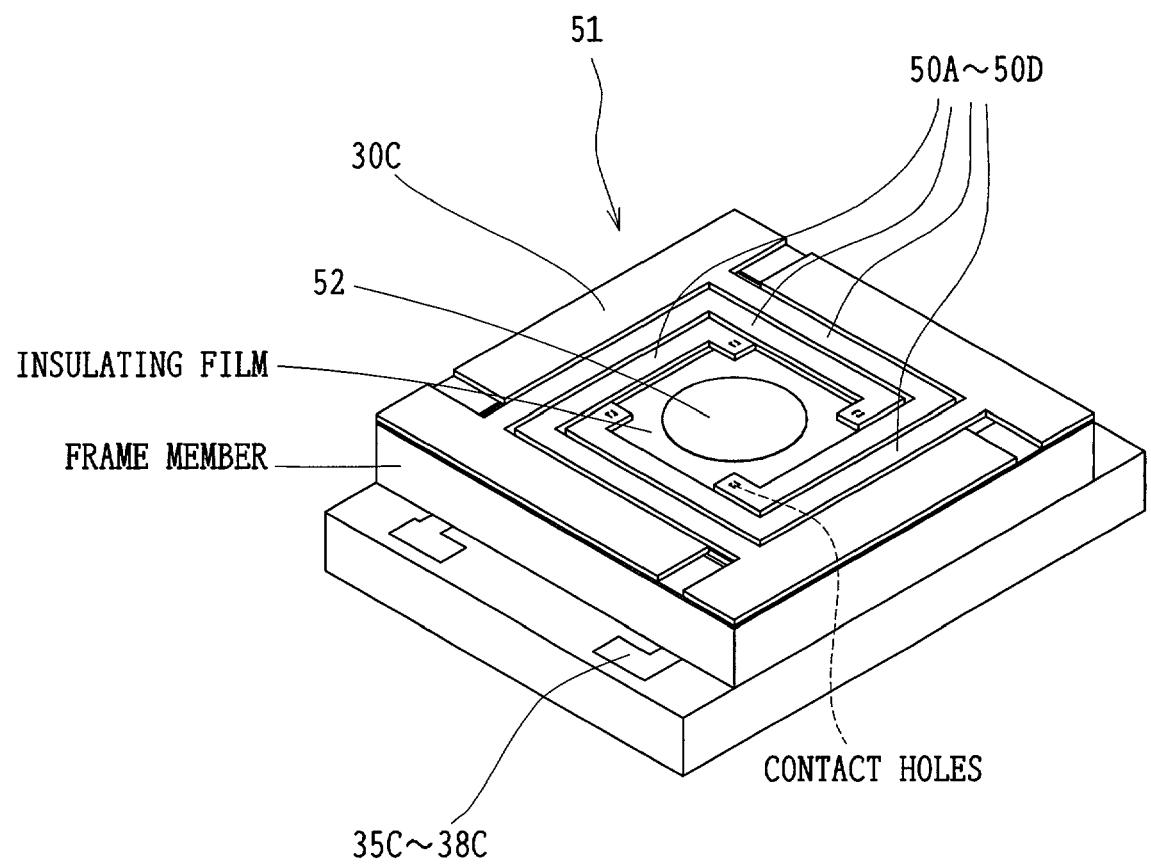
FIG. 16 is a perspective view showing the whole of an example of a plate spring actuator applicable to the shake compensating device of the present invention.

As shown in FIG. 16, the deformable mirror in which flexible thin film portions provided to one of two electrodes are constructed like plate springs may be used. Each of these plate spring members can be made by using a micromachining technique, with silicon as its base, known as an MEMS (micro electromechanical system). This is advantageous for miniaturization and notably, low rigidity of a spring member.

Since this technique allows the thickness of the reflecting mirror to be reduced, inertial mass becomes small and the response characteristic of the deformable mirror can be improved. A less number of parts is required and cost can be reduced.

Figure 17B:
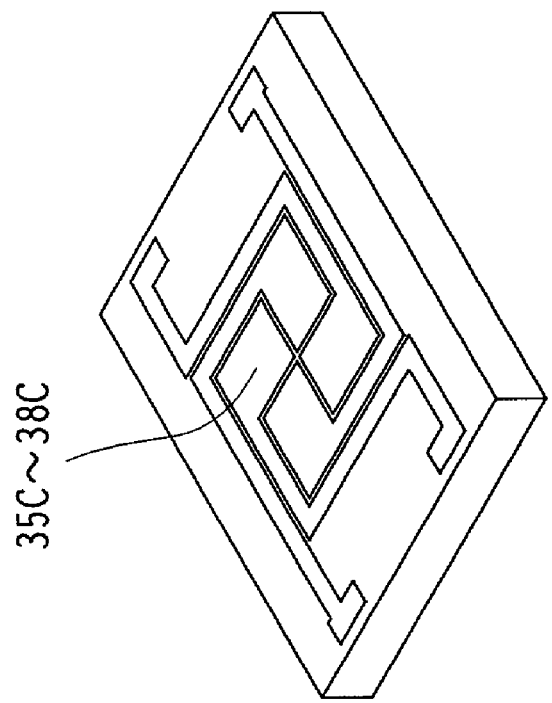
FIG. 17B is a perspective view showing the lower substrate of the plate spring actuator of FIG. 16, viewed from the right side.
Figure 17A:
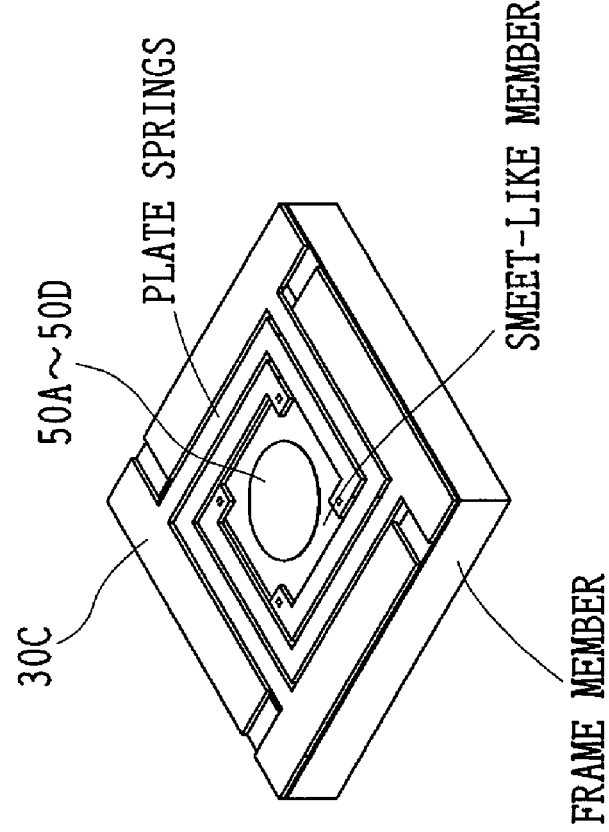
FIG. 17A is a perspective view showing the upper substrate of the plate spring actuator of FIG. 16, viewed from the right side.

The structure of this deformable mirror is described below with reference to FIGS. 16, 17A, and 17B.

FIG. 16 shows an example of a plate spring actuator applicable to the shake compensating device of the present invention. FIGS. 17A and 17B show the details of individual parts of the plate spring actuator in FIG. 16.

In FIG. 16, a structure including plate springs 50A-50D and electrodes 30C and 35C-38C is referred to as a plate spring actuator 51. A mirror 52 is provided on the plate spring actuator 51.

By applying different voltages across the electrodes, the mirror 52 can be arbitrarily changed in direction by electrostatic forces and performs the same function of the deformable mirror of FIGS. 6A and 6B.

The plate spring actuator has the merit that its lightweight and compact design can be achieved.

The control techniques shown in FIGS. 9-12, applied to the example of FIGS. 6A and 6B are also applicable to the plate spring actuator 51 of FIG. 16.

For example, even when a lens is placed instead of the reflecting mirror 32 of FIG. 7 and the mirror 52 of FIG. 16, the compensation for shake can be obtained.

The deformable mirror used in the shake compensating device of the present invention may be constructed so that it is deformed by electromagnetic forces in addition to the electrostatic forces, or so that a piezoelectric substance is contained in the substrate provided with the electrodes. A coil constitutes one of the electrodes.

The electrode portion of the deformable mirror which is deformed may be also used as the reflecting mirror.

Instead of the deformable mirror, a variable focal-length lens with a plurality of electrodes may be used.

Subsequently, a description will be given of the examples of structures of the deformable mirror, the variable focal-length lens, and the like which are applicable to the shake compensating device of the present invention.

The deformable mirror applicable to the shake compensating device of the present invention is first described.

Figure 18:
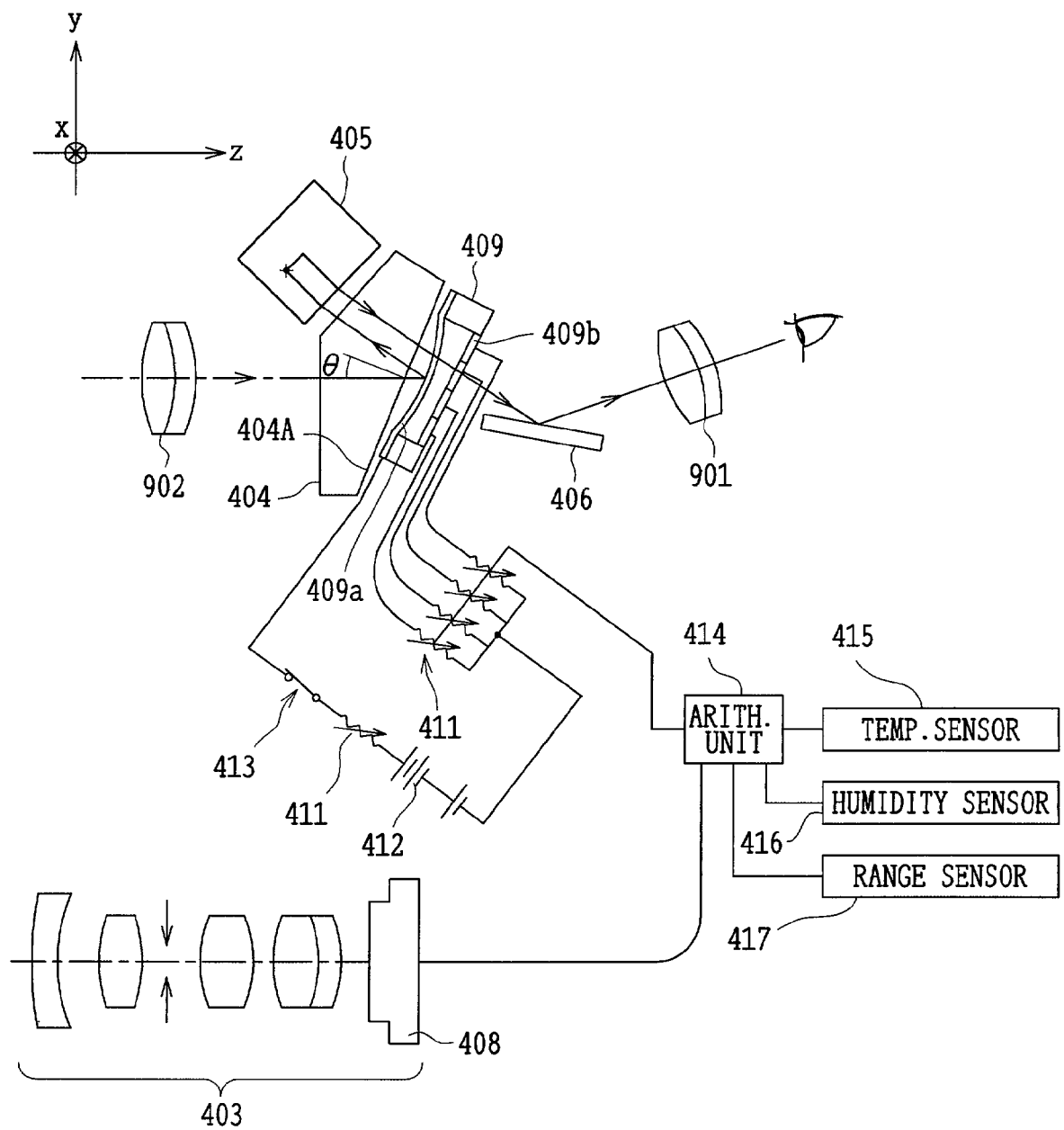
FIG. 18 is a view showing a schematic construction of an optical device applying the shake compensating device of the present invention.

FIG. 18 shows a schematic construction of another embodiment applying the shake compensating device of the present invention, that is, a Keplerian finder for a digital camera using a variable optical-property mirror. It can, of course, be used for a silver halide film camera.

Reference is first made to a variable optical-property mirror 409. The variable optical-property mirror 409 refers to an optical-property deformable mirror (which is hereinafter simply called the deformable mirror) comprised of a thin film (reflecting surface) 409a coated with aluminum and a plurality of electrodes 409b. Reference numeral 411 denotes a plurality of variable resistors connected to the electrodes 409b; 412 denotes a power supply connected between the thin film 409a and the electrodes 409b through the variable resistors 411 and a power switch 413; 414 denotes an arithmetical unit for controlling the resistance values of the variable resistors 411; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror 409 need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187-190, 1997, is such that when the voltage is applied across the plurality of electrodes 409b, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 902 and 901 and/or the prism 404, the isosceles rectangular prism 405, and the mirror 406, or the degradation of imaging performance by the expansion and deformation of a lens frame and assembly errors of parts, such as optical elements and frames. In this way, a focusing adjustment and correction for aberration produced by the focusing adjustment can be always properly made.

Figure 20:
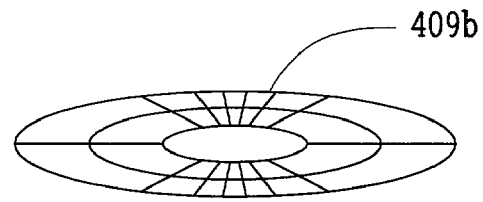
FIG. 20 is an explanatory view showing one aspect of electrodes used in the deformable mirror of FIG. 19.
Figure 21:
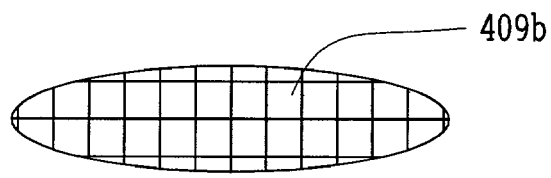
FIG. 21 is an explanatory view showing another aspect of electrodes used in the deformable mirror of FIG. 19.

Also, it is only necessary that the shape of the electrodes 409b, for example, as shown in FIGS. 20 and 21, is selected in accordance with the deformation of the thin film 409a.

According to the embodiment, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 18, a mark + on the optical path indicates that a ray of light travels toward the back side of the plane of the page), and is reflected by the mirror 406 to enter the eye through the eyepiece 901. As mentioned above, the lenses 902 and 901, the prisms 404 and 405, and the deformable mirror 409 constitute the observing optical system of the optical device in the embodiment. The surface profile and thickness of each of these optical elements is optimized and thereby aberration can be minimized.

Specifically, the configuration of the thin film 409a, as the reflecting surface, is controlled in such a way that the resistance values of the variable resistors 411 are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411 so that voltages by which the configuration of the thin film 409a is determined are applied to the electrodes 409b. Thus, since the thin film 409a is deformed with the voltages applied to the electrodes 409b, that is, the electrostatic force, it assumes various shapes including an aspherical surface, according to circumstances, and when the polarity of the voltage to be applied is changed, a convex surface can be provided. The range sensor 417 need not necessarily be used, and in this case, it is only necessary that an imaging lens 403 of the digital camera is moved so that a high-frequency component of an image signal from a solid-state image sensor 408 is roughly maximized, and the object distance is calculated from this position so that an observer's eye is able to focus upon the object image by deforming the deformable mirror.

When the thin film 409a is made of synthetic resin, such as polyimide, it can be considerably deformed even at a low voltage, which is advantageous. Also, the prism 404 and the deformable mirror 409 can be integrally configured into a unit. This unit is an example of the optical device using the shake compensating device of the present invention.

Although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the photographing apparatus of the embodiment, the lenses 902 and 901 are arranged separately from the prism 404. However, if the prisms 404 and 405, the mirror 406, and the deformable mirror 409 are designed so that aberration can be eliminated without providing the lenses 902 and 901, the prisms 404 and 405 and the deformable mirror 409 will be configured as one optical block, and the assembly is facilitated. Parts or all of the lenses 902 and 901, the prisms 404 and 405, and the mirror 406 may be made of glass. By doing so, a photographing apparatus with a higher degree of accuracy is obtained.

Also, although in FIG. 18 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

Subsequently, reference is made to other structures of the deformable mirror 409.

Figure 19:
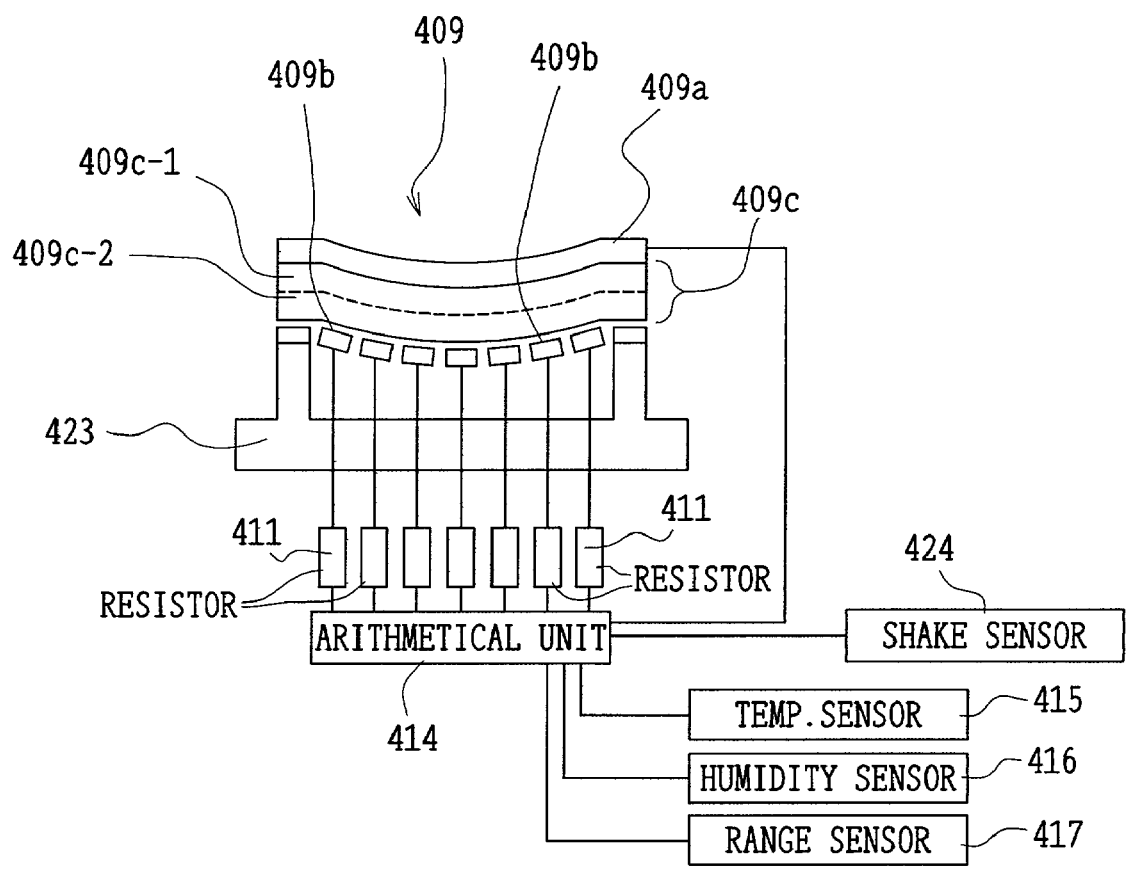
FIG. 19 is a view showing a schematic construction of a further example of the deformable mirror applicable to the shake compensating device of the present invention.

FIG. 19 shows another embodiment of the deformable mirror 409 applicable to the shake compensating device of the present invention. In this embodiment, a piezoelectric element 409c is interposed between the thin film 409a and the electrodes 409b, and these are placed on a support 423. A voltage applied to the piezoelectric element 409c is changed in accordance with the individual electrodes 409b, and thereby the piezoelectric element 409c causes expansion or contraction which is partially different so that the shape of the thin film 409a can be changed. The configuration of the electrodes 409b may be selected in accordance with the deformation of the thin film 409a. For example, as illustrated in FIG. 20, it may have a concentric division pattern, or as in FIG. 21, it may be a rectangular division pattern. As other patterns, proper configurations can be chosen. In FIG. 19, reference numeral 424 represents a shake sensor connected to the arithmetical unit 414. The shake sensor 424, for example, detects the shake of a digital camera and changes the voltages applied to the electrodes 409b through the arithmetical unit 414 and the variable resistors 411 in order to deform the thin film 409a to compensate for the blurring of an image caused by the shake. At this time, the signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

Figure 22:
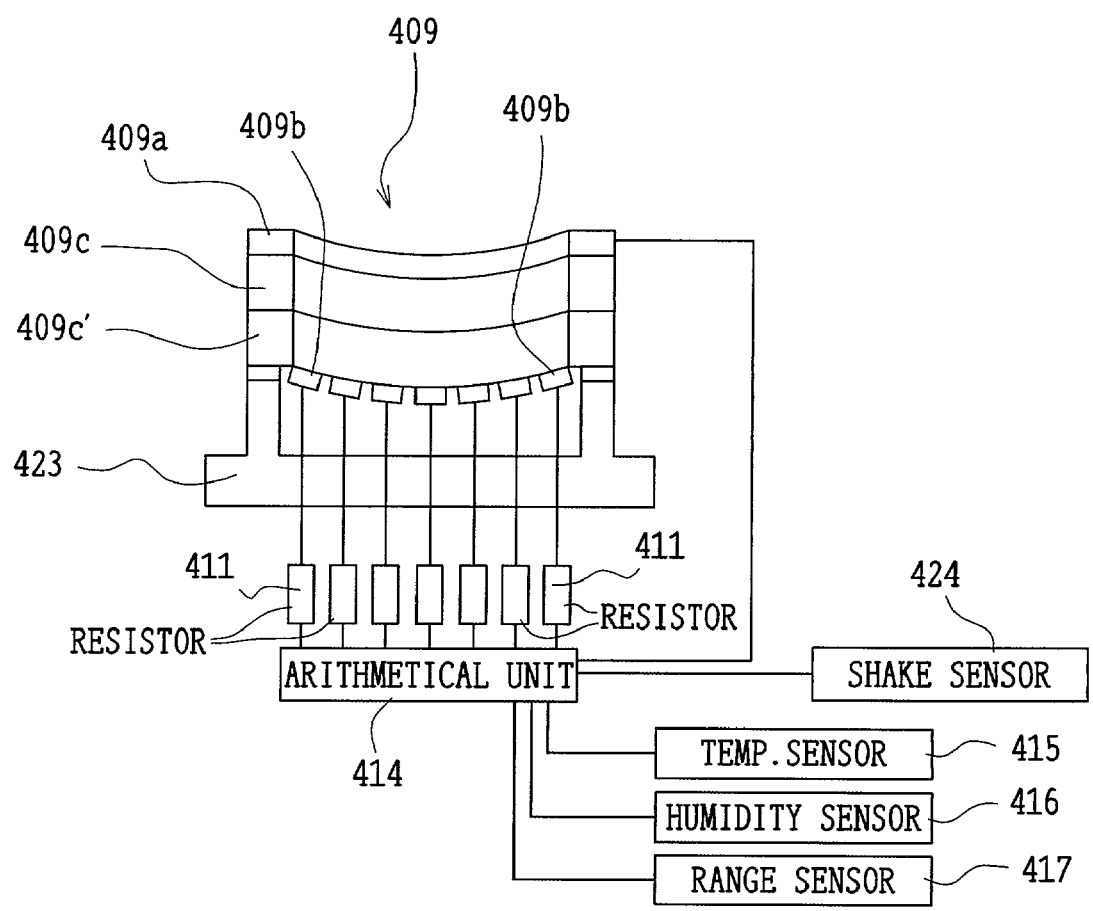
FIG. 22 is a view showing schematically another example of the deformable mirror applicable to the shake compensating device of the present invention.

FIG. 22 shows still another embodiment of the deformable mirror 409 applicable to the shake compensating device of the present invention. This embodiment has the same construction as the embodiment of FIG. 19 with the exception that two piezoelectric elements 409c and 409c' are interposed between the thin film 409a and the electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film 409a becomes stronger than in the embodiment of FIG. 19 and as a result, the shape of the mirror surface can be considerably changed.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When the piezoelectric elements 409c and 409c' are used, it is also possible to properly deform the thin film 409a in the above embodiment if their thicknesses are made uneven.

For materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

When an electrostrictive substance, for example, acrylic elastomer or silicon rubber, is used for the piezoelectric element 409c shown in FIGS. 19 and 22, the piezoelectric element 409c, as indicated by a broken line in FIG. 19, may be constructed by cementing another substrate 409c-1 to an electrostrictive substance 409c-2.

Figure 23:
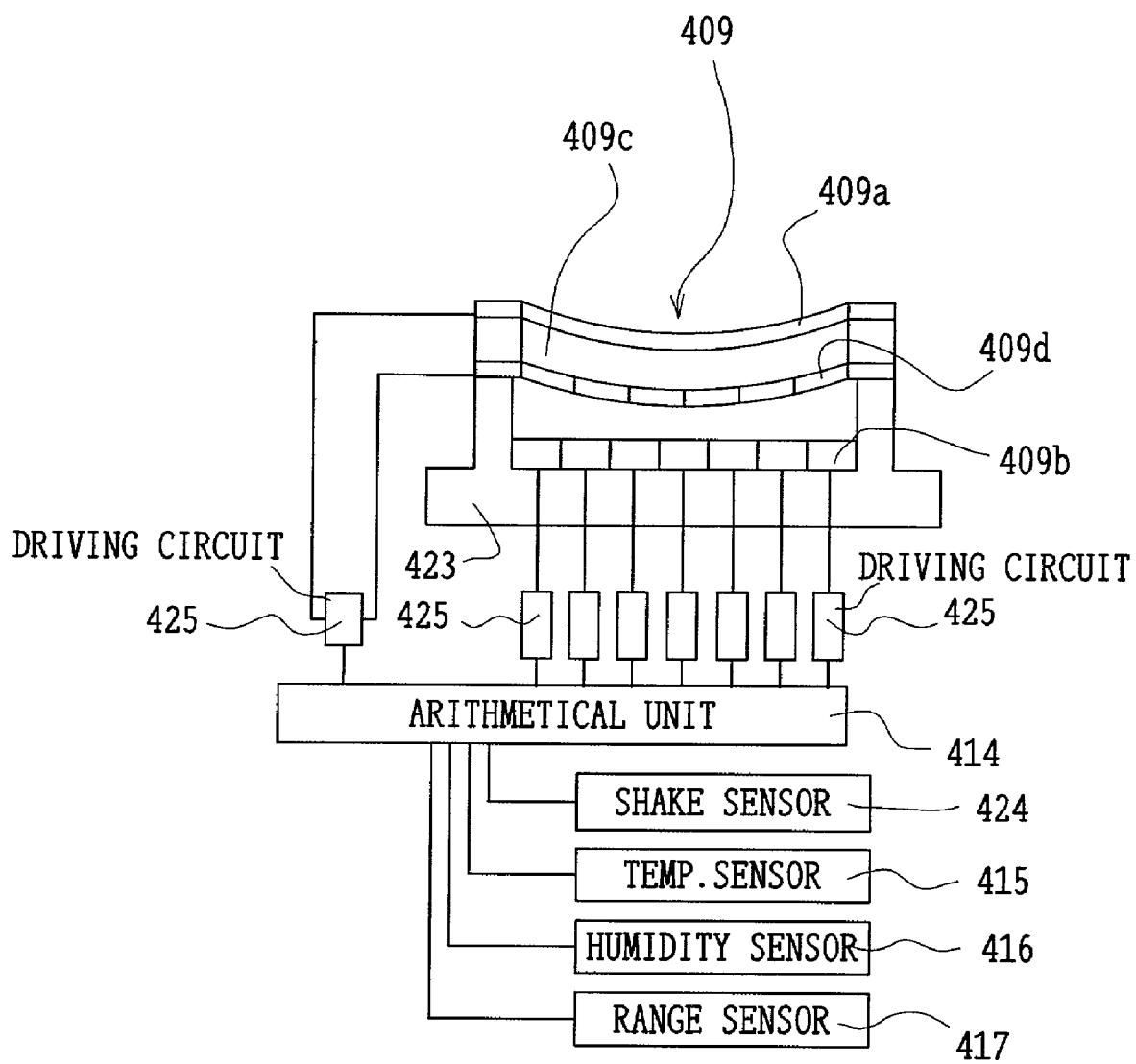
FIG. 23 is a view showing schematically another example of the deformable mirror applicable to the shake compensating device of the present invention.

FIG. 23 shows another embodiment of the deformable mirror 409 applicable to the shake compensating device of the present invention. The deformable mirror 409 of this embodiment is designed so that the piezoelectric element 409c is sandwiched between the thin film 409a and an electrode 409d, and voltages are applied between the thin film 409a and the electrode 409d through a driving circuit 425' controlled by the arithmetical unit 414. Furthermore, voltages are also applied to the electrodes 409b provided on the support 423, through driving circuits 425 controlled by the arithmetical unit 414. In this embodiment, therefore, the thin film 409a can be doubly deformed by electrostatic forces due to the voltages applied between the thin film 409a and the electrode 409d and applied to the electrodes 409b. There are advantages that various deformation patterns can be provided and the response is quick, compared with any of the above embodiments.

By changing the signs of the voltages applied between the thin film 409a and the electrode 409d, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 409*d* may be constructed as a plurality of electrodes like the electrodes 409*b*. This condition is shown in FIG. 23. In the present invention, all of the piezoelectric effect, the electrostrictive effect, and electrostriction are generally called the piezoelectric effect. Thus, it is assumed that the electrostrictive substance is included in the piezoelectric substance.

Figure 24:
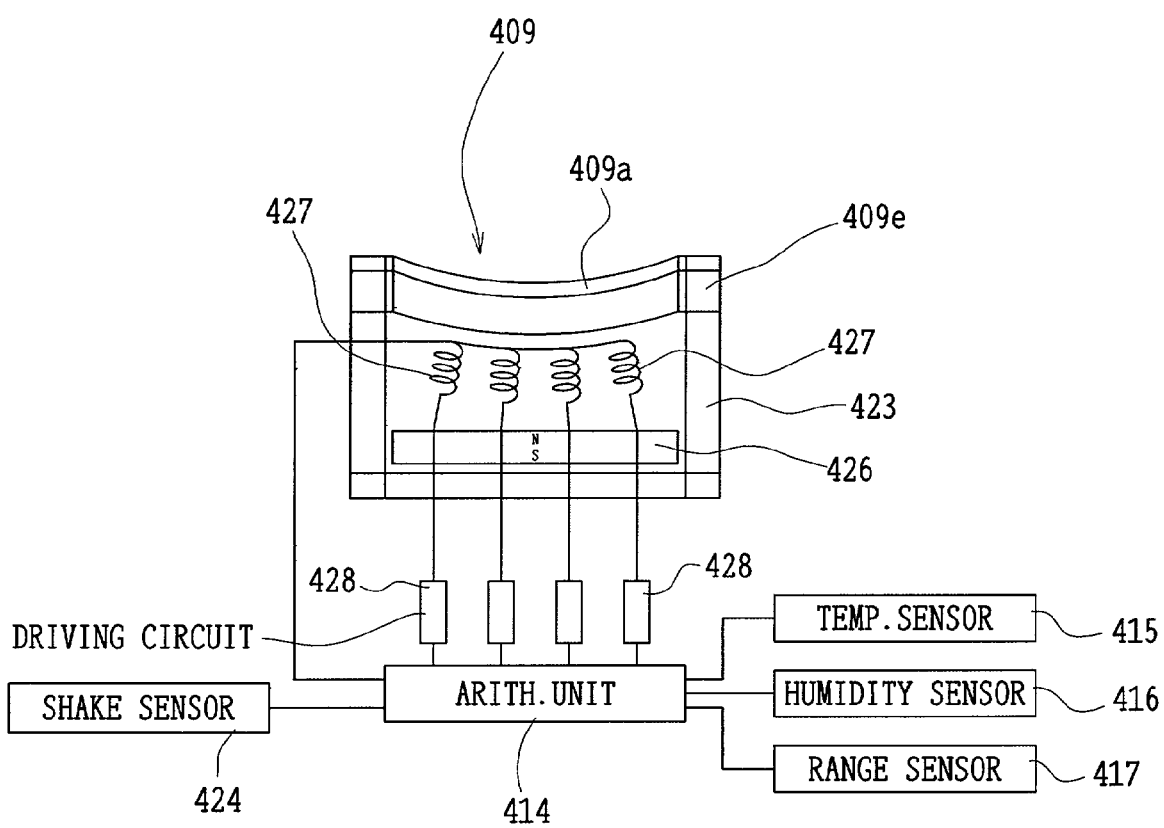
FIG. 24 is a view showing schematically another example of the deformable mirror applicable to the shake compensating device of the present invention.

FIG. 24 shows another embodiment of the deformable mirror 409 applicable to the shake compensating device of the present invention. The deformable mirror 409 of this embodiment is designed so that the shape of the reflecting surface can be changed by utilizing an electromagnetic force. A permanent magnet 426 mounted and fixed on a bottom surface inside the support 423, and the periphery of a substrate 409*e* made with silicon nitride or polyimide is mounted on the top surface thereof. The thin film 409*a* consisting of the coating of metal, such as aluminum, is deposited on the surface of the substrate 409*e*, thereby constituting the deformable mirror 409. Below the substrate 409*e*, a plurality of coils 427 are arranged and connected to the arithmetical unit 414 through the driving circuits 428. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409*e* and the thin film 409*a*.

In this case, a different amount of current can also be caused to flow through each of the coils 427. A single coil 427 may be used, and the permanent magnet 426 may be provided on the substrate 409*e* so that the coils 427 are arranged on the bottom side in the support 423. It is desirable that the coils 427 are fabricated by a lithography process. A ferromagnetic core (iron core) may be encased in each of the coils 427.

Figure 25:
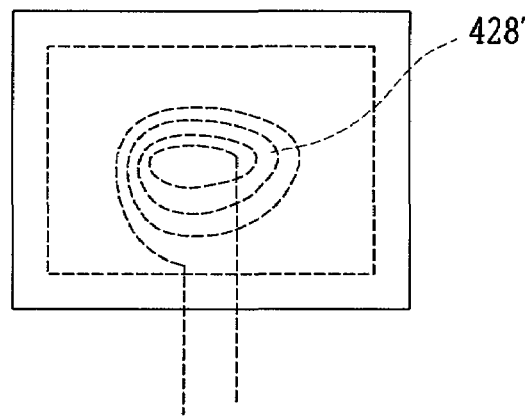
FIG. 25 is an explanatory view showing the winding density of a thin-film coil in the deformable mirror of FIG. 24.

In this case, each of the coils 427, as illustrated in FIG. 25, can be designed so that a coil density varies with place and thereby a desired deformation is brought to the substrate 409*e* and the thin film 409*a*. A single coil 427 may be used, and a ferromagnetic core (iron core) may be encased in each of the coils 427.

Figure 26:
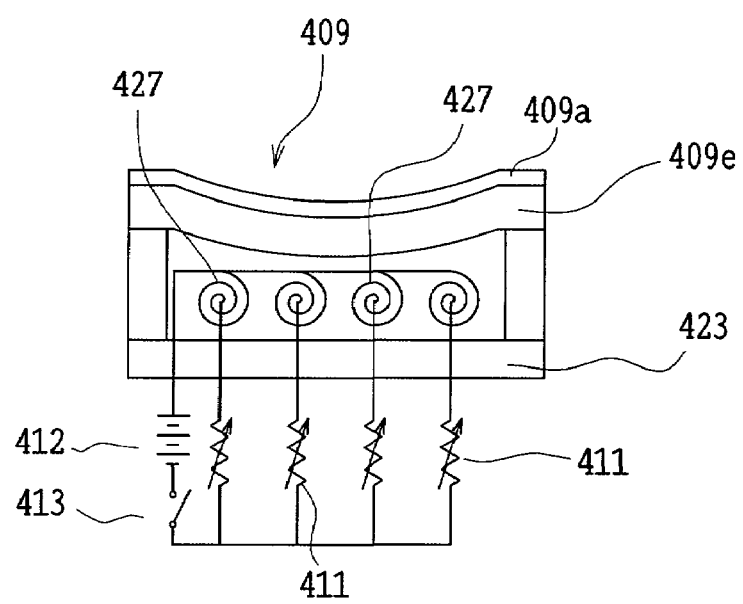
FIG. 26 is a view showing schematically another example of the deformable mirror applicable to the shake compensating device of the present invention.
Figure 27:
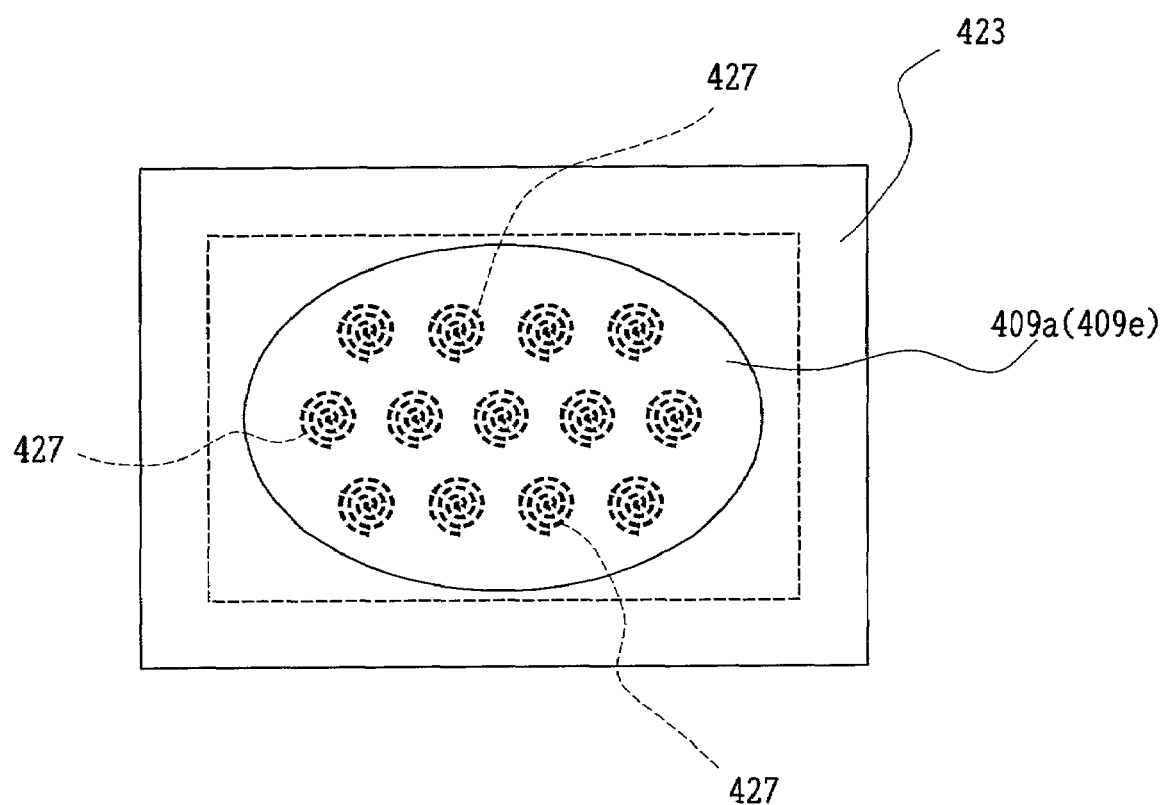
FIG. 27 is an explanatory view showing an example of an array of coils in the deformable mirror of FIG. 26.
Figure 28:
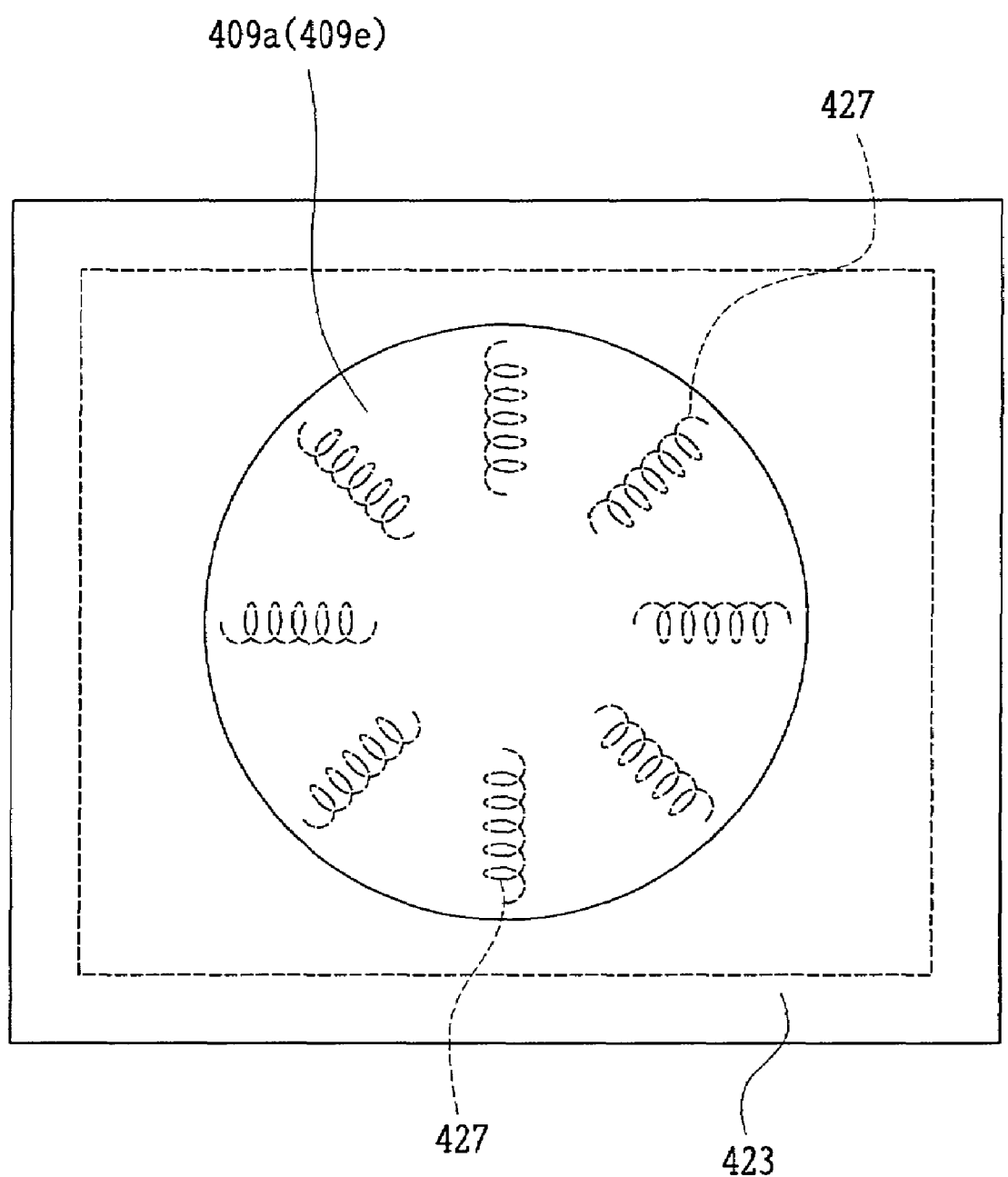
FIG. 28 is an explanatory view showing another example of an array of coils in the deformable mirror of FIG. 26.
Figure 29:
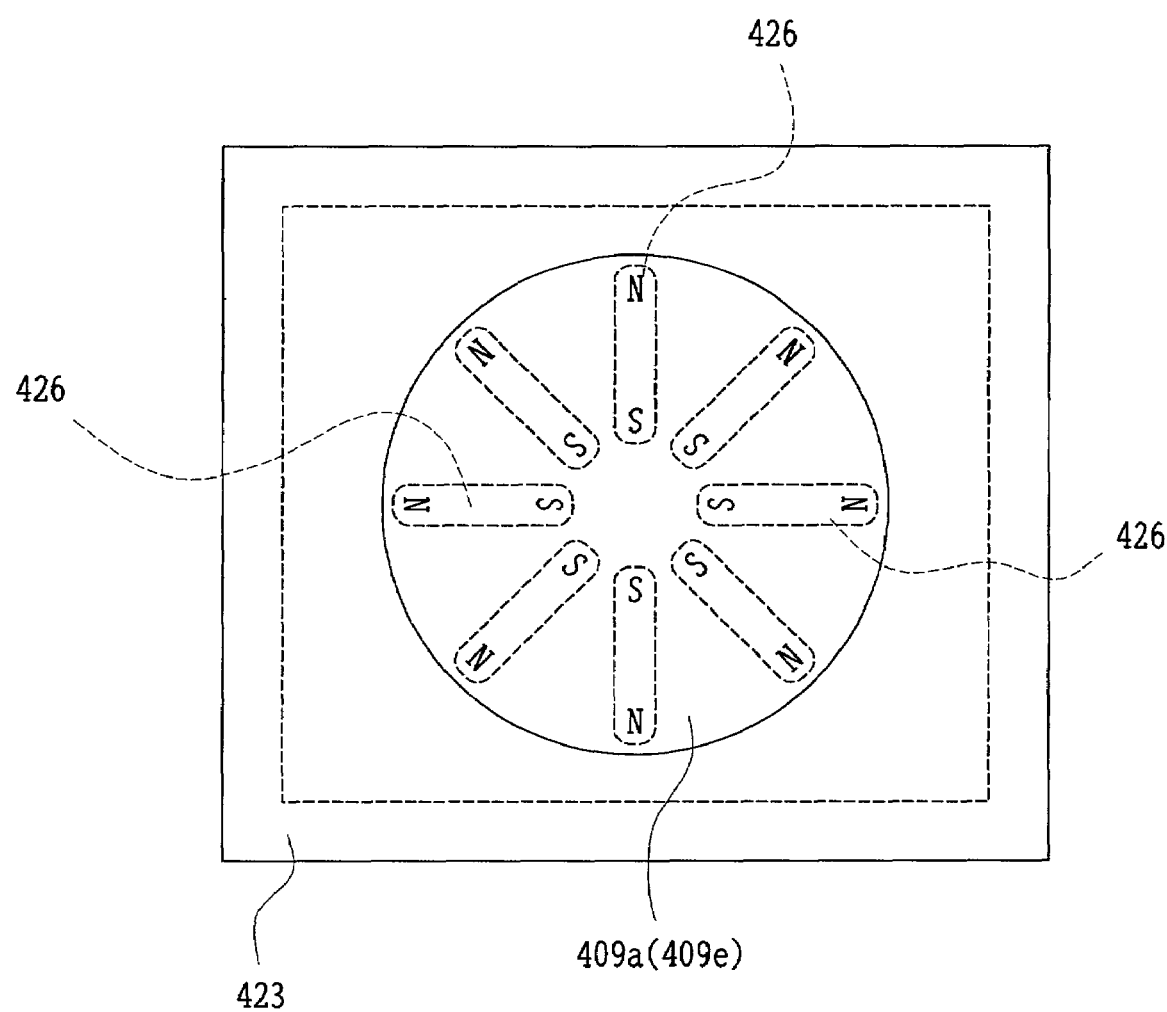
FIG. 29 is an explanatory view showing an array of permanent magnets suitable for the array of coils of FIG. 28.

FIG. 26 shows another embodiment of the deformable mirror 409 applicable to the shake compensating device of the present invention. In the deformable mirror 409 of this embodiment, the substrate 409*e* is made with a ferromagnetic such as iron, and the thin film 409*a* as a reflecting film is made with aluminum. In this case, since the thin film coils need not be used, the structure is simple and the manufacturing cost can be reduced. If the power switch 413 is replaced with a changeover and power on-off switch, the directions of currents flowing through the coils 427 can be changed, and the configurations of the substrate 409*e* and the thin film 409*a* can be changed at will. FIG. 27 shows an array of the coils 427 in this embodiment, and FIG. 28 shows another array of the coils 427. These arrays are also applicable to the embodiment of FIG. 24. FIG. 29 shows an array of the permanent magnets 426 suitable for the array of the coils of FIG. 28 in the embodiment of FIG. 24. Specifically, when the permanent magnets 426, as shown in FIG. 29, are radially arranged, a delicate deformation can be provided to the substrate 409*e* and the thin film 409*a* in contrast with the embodiment of FIG. 24. As mentioned above, when the electromagnetic force is used to deform the substrate 409*e* and the thin film 409*a* (in the embodiments of FIGS. 24 and 26), there is the advantage that they can be driven at a lower voltage than in the case where the electrostatic force is used.

Some embodiments of the deformable mirror have been described, but as shown in FIG. 23, at least two kinds of forces may be used in order to change the shape of the deformable mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 30:
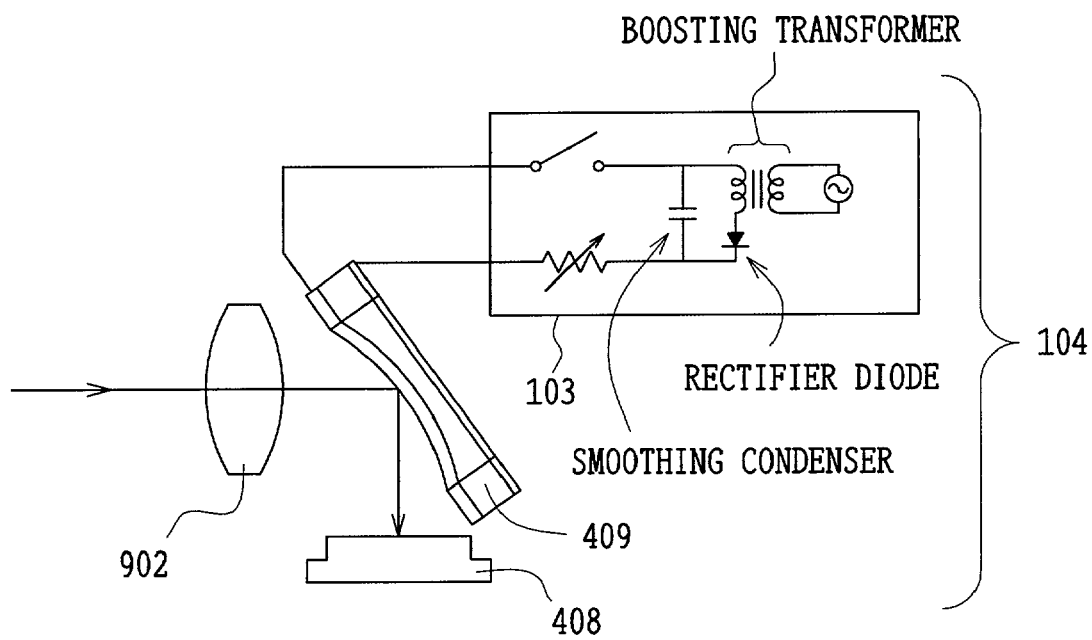
FIG. 30 is a view showing schematically an imaging system applying the shake compensating device of the present invention.

FIG. 30 shows an imaging system which uses the deformable mirror 409 applicable to the shake compensating device, in another embodiment of the present invention, and which is used, for example, in a digital camera of a cellular phone, a capsule endoscope, an electronic endoscope, a digital camera for personal computers, or a digital camera for PDAs.

In the imaging system of this embodiment, one imaging unit 104 is constructed with the deformable mirror 409, the lens 902, the solid-state image sensor 408, and a control system 103. In the imaging unit 104 of the embodiment, light from an object passing through the lens 902 is condensed by the deformable mirror 409 and is imaged on the solid-state image sensor 408. The deformable mirror 409 is a kind of variable optical-property element and is also referred to as the variable focal-length mirror.

According to this embodiment, even when the object distance is changed, the deformable mirror 409 is deformed and thereby the object can be brought into a focus. The embodiment need not use the motor to move the lens and excels in compact and lightweight design and low power consumption. The imaging unit 104 can be used in any of the embodiments as the imaging system of the present invention. When a plurality of deformable mirrors 409 are used, a zoom or variable magnification imaging system or optical system can be constructed.

In FIG. 30, an example of a control system which includes the boosting circuit of a transformer using coils in the control system 103 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Figure 31:
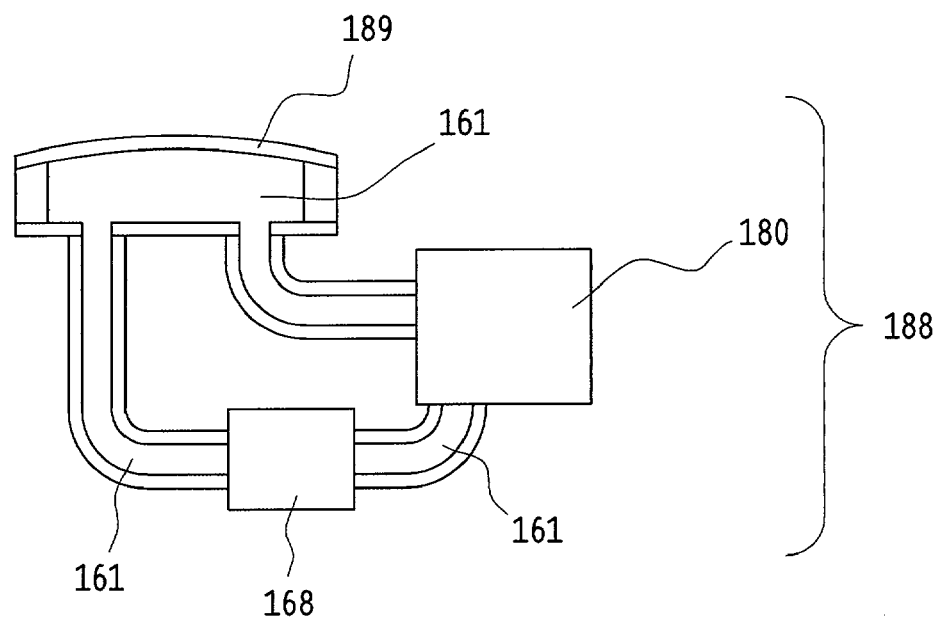
FIG. 31 is a view showing schematically another example of the deformable mirror applicable to the shake compensating device of the present invention.

FIG. 31 shows the deformable mirror 188 in which a fluid 161 is taken in and out by a micropump 180 to deform a mirror surface, in another embodiment, applicable to the shake compensating device of the present invention. According to this embodiment, there is the merit that the mirror surface can be considerably deformed.

The micropump 180 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 32:
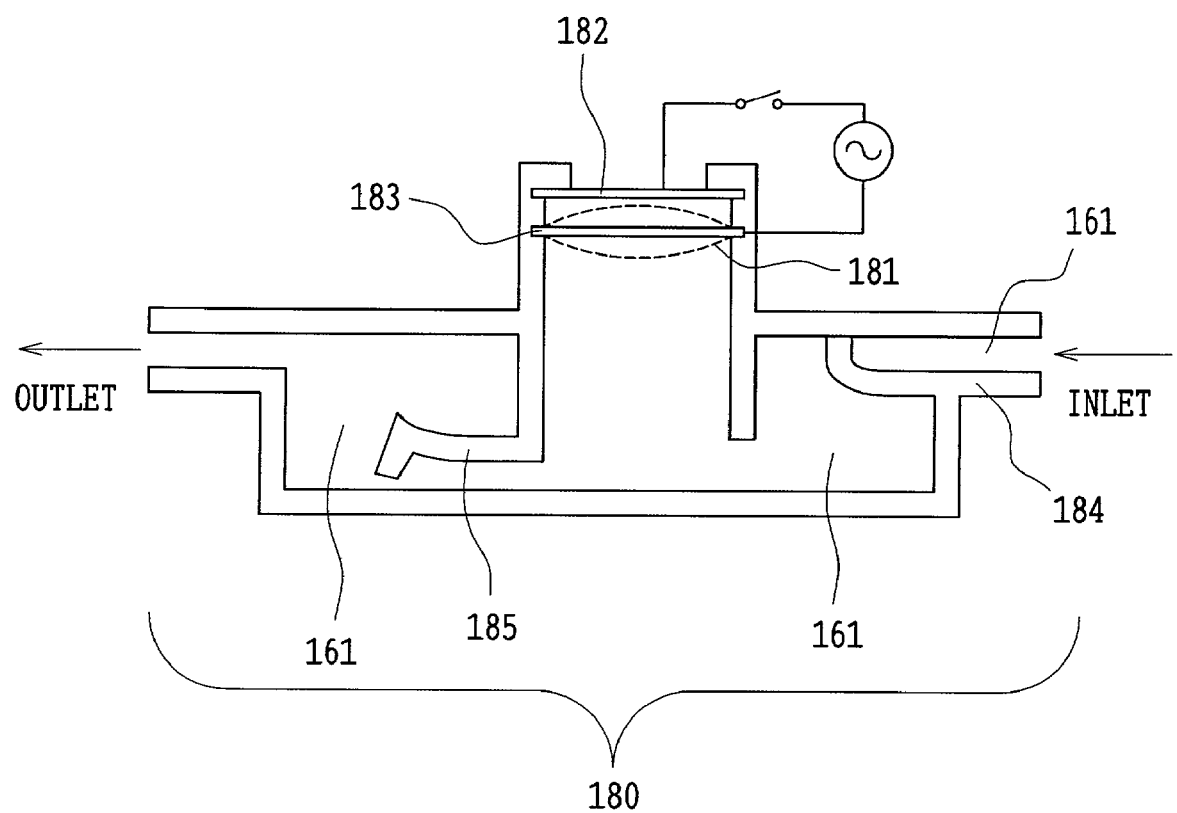
FIG. 32 is a view showing schematically a micropump of FIG. 31.

FIG. 32 shows an embodiment of a micropump applicable to the shake compensating device of the present invention. In the micropump 180 of this embodiment, a vibrating plate 181 is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the deformable mirror 188 of this embodiment, the reflecting film 181 is deformed into a concave or convex surface in accordance with the amount of the fluid 161, and thereby functions as the deformable mirror. The deformable mirror 188 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 30, it is desirable that the boosting transformer or the piezoelectric transformer is used to constitute the control system.

If the thin film 409a for reflection is also provided in a portion which is not deformed, it can be used as a reference surface when the profile of the deformable mirror is measured by an interferometer, which is convenient.

Subsequently, reference is made to the variable focal-length lens applicable to the shake compensating device of the present invention.

Figure 33:
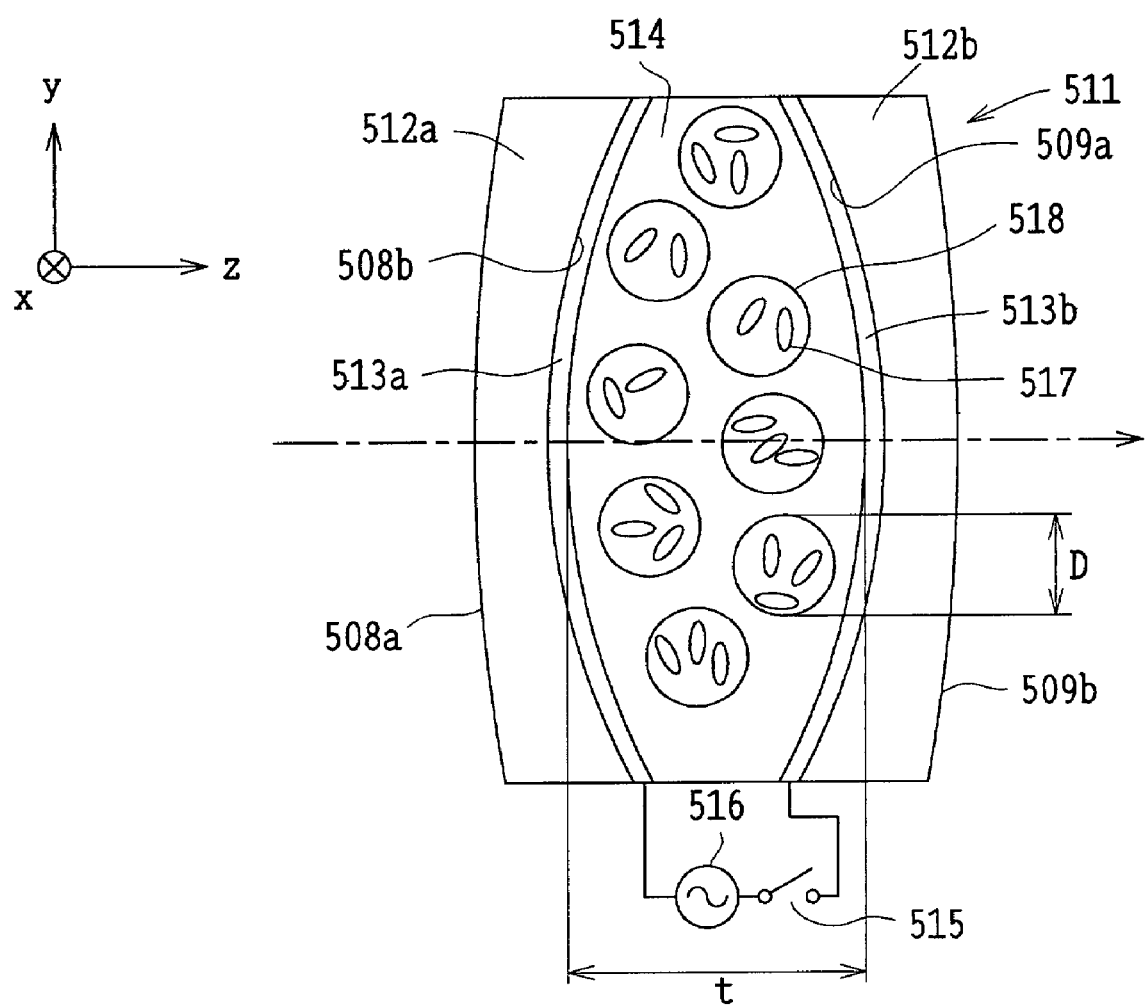
FIG. 33 is a view showing the principle of a variable focal-length lens applicable to the shake compensating device of the present invention.

FIG. 33 shows the structure of the variable focal-length lens applicable to the shake compensating device of the present invention. A variable focal-length lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses through transparent electrodes 513a and 513b. Incident light is converged through the first and second lenses 512a and 512b. The transparent electrodes 513a and 513b are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and its volume is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wavelength of light used is denoted by $\lambda$, the average diameter D is chosen to satisfy the following condition:

$$2\text{ nm} \leq D \leq \lambda/5 \quad (1)$$

That is, the size of each of the liquid crystal molecules 517 is at least about 2 nm and thus the lower limit of the average diameter D is set to about 2 nm or larger. The upper limit of the diameter D depends on a thickness t of the macromolecular dispersed liquid crystal layer 514 in the direction of the optical axis of the variable focal-length lens 511. However, if the diameter is larger than the wavelength $\lambda$, a difference between the refractive indices of the macromolecules and the liquid crystal molecules 517 will cause light to be scattered at the interfaces of the macromolecular cells 518 and will render the liquid crystal layer 514 opaque. Hence, the upper limit of the diameter D should be $\lambda/5$ or less. A high degree of accuracy is not necessarily required, depending on an optical product using the variable focal-length lens. In this case, the diameter D below the value of the wavelength $\lambda$ is satisfactory. Also, the transparency of the macromolecular dispersed liquid crystal layer 514 deteriorates with increasing thickness t.

Figure 34:
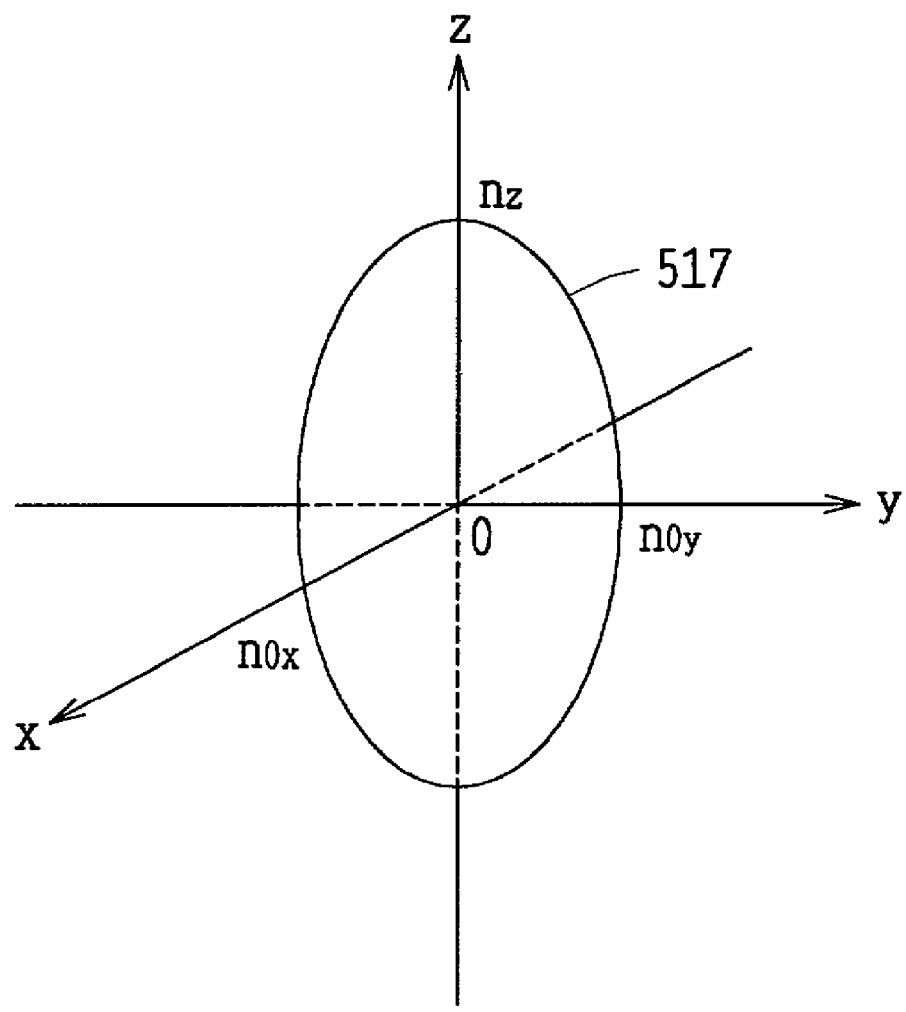
FIG. 34 is a view showing the index ellipsoid of a nematic liquid crystal molecule of uniaxial anisotropy.

In the liquid crystal molecules 517, for example, uniaxial nematic liquid crystal molecules are used. The index ellipsoid of each of the liquid crystal molecules 517 is as shown in FIG. 34. That is, $$n_{ox} = n_{oy} = n_o \quad (2)$$

where $n_o$ is the refractive index of an ordinary ray and $n_{ox}$ and $n_{oy}$ are refractive indices in directions perpendicular to each other in a plane including ordinary rays.

Figure 35:
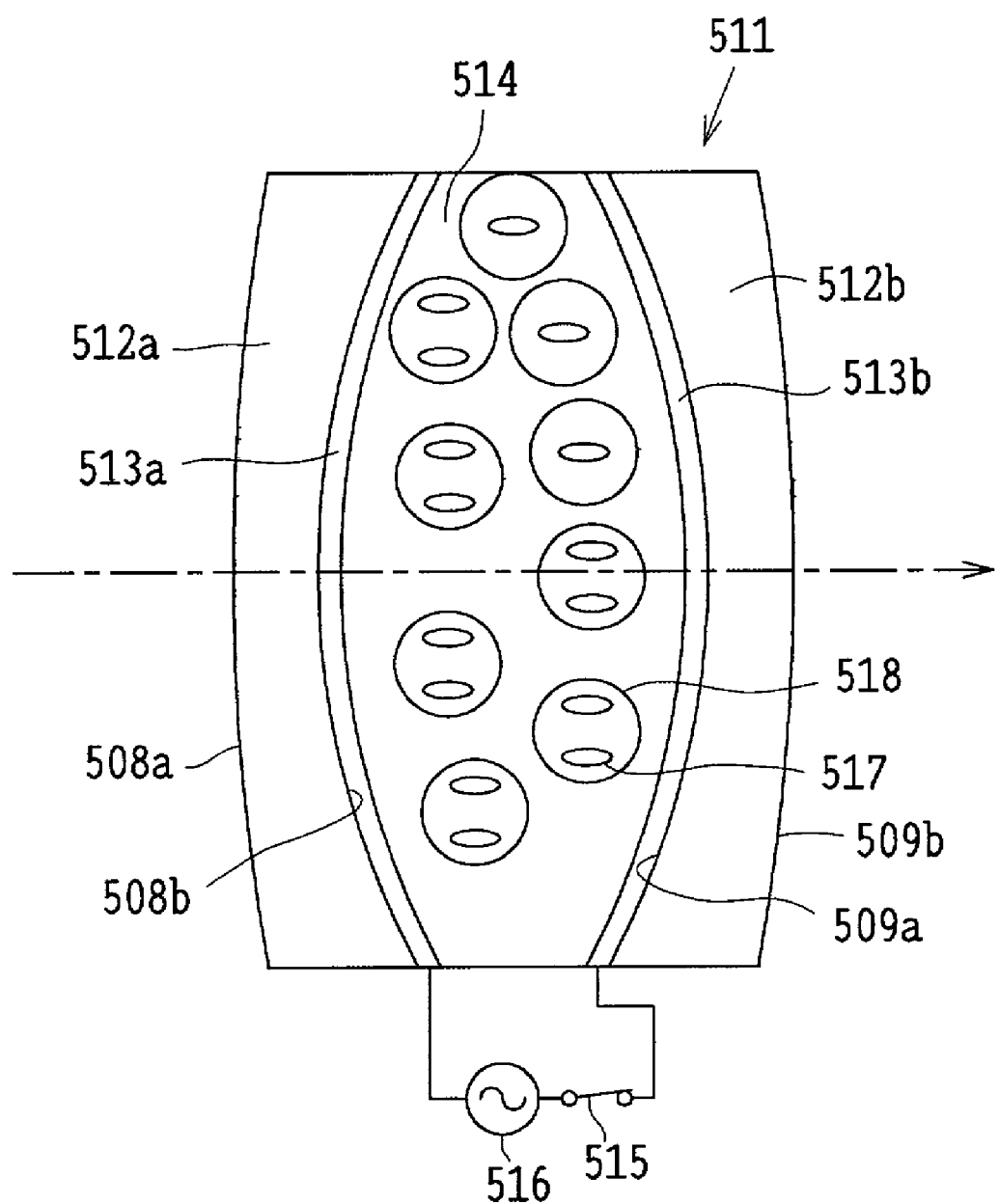
FIG. 35 is a view showing a state where an electric field is applied to a macromolecular dispersed liquid crystal layer in FIG. 33.

Here, in the case where the switch 515, as shown in FIG. 33 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 35, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 36:
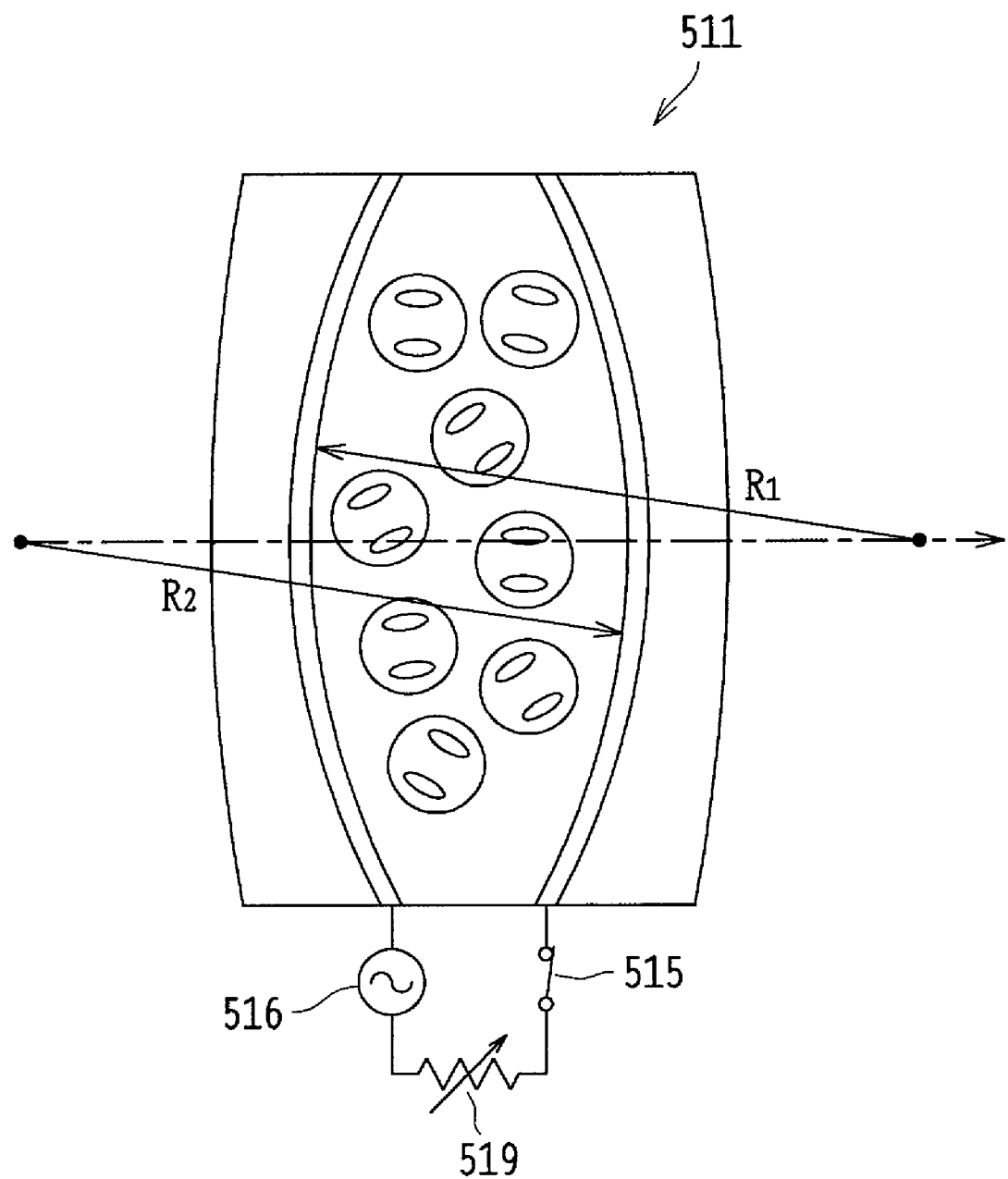
FIG. 36 is a view showing an example where a voltage applied to the macromolecular dispersed liquid crystal layer in FIG. 33 can be changed.

The voltage applied to the macromolecular dispersed liquid crystal layer 514, for example, as shown in FIG. 36, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 33, that is, in the case where the electric field is not applied to the macromolecular dispersed liquid crystal layer 514, when the refractive index in the direction of the major axis of the index ellipsoid, as shown in FIG. 34, is denoted by $n_z$, an average refractive index $n_{LC}'$ of the liquid crystal molecules 517 is roughly given by $$(n_{ox} + n_{oy} + n_z)/3 = n_{LC}' \quad (3)$$

Also, when the refractive index $n_z$ is expressed as a refractive index $n_e$ of an extraordinary ray, an average refractive index $n_{LC}$ where Equation (2) is established is given by $$(2n_o + n_e)/3 = n_{LC} \quad (4)$$

In this case, when the refractive index of each of the macromolecules constituting the macromolecular cells 518 is represented by $n_p$ and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC}' + (1-ff)n_p \quad (5)$$

Thus, as shown in FIG. 36, when the radii of curvature of the inner surfaces of the lenses 512a and 512b, that is, the surfaces on the side of the liquid crystal layer 514, are represented by $R_1$ and $R_2$, a focal length $f_1$ of the variable focal-length lens 511 is given by $$1/f_1 = (n_A - 1)(1/R_1 - 1/R_2) \quad (6)$$

Also, when the center of curvature is located on the image side, it is assumed that the radius of curvature $R_1$ or $R_2$ is positive. Refraction caused by the outer surface of each of the lenses 512a and 512b is omitted. That is, the focal length of the lens of only the liquid crystal layer 514 is given by Equation (6).

When the average refractive index of ordinary rays is expressed as $$(n_{ox}+n_{oy})/2=n_o' \tag{7}$$

a refractive index $n_B$ of the liquid crystal layer 514 in the case of FIG. 35, namely, in the case where the electric field is applied to the liquid crystal layer 514, is given by $$n_B = f\!f\cdot n_o' + (1-f\!f)n_p \tag{8}$$

and thus a focal length $f_2$ of the lens of only the liquid crystal layer 514 in this case is given by $$1/f_2 = (n_B-1)(1/R_1 - 1/R_2) \tag{9}$$

Also, the focal length where a lower voltage than in FIG. 35 is applied to the liquid crystal layer 514 is a value between the focal length $f_1$ given by Equation (6) and the focal length $f_2$ by Equation (9).

From Equations (6) and (9), a change rate of the focal length by the liquid crystal layer 514 is given by $$|(f_2-f_1)/f_2| = |(n_B-n_A)/(n_B-1)| \tag{10}$$

Thus, in order to increase the change rate, it is only necessary to increase the value of $|(n_B-n_A)|$. Here, $$n_B - n_A = f\!f(n_o' - n_{LC}') \tag{11}$$

and hence if the value of $|n_o'-n_{LC}'|$ is increased, the change rate can be raised. Practically, since the refractive index $n_B$ is about 1.3-2, the value of $|n_o'-n_{LC}'|$ is chosen so as to satisfy the following condition:

$$0.01 \leq |n_o' - n_{LC}'| \leq 10 \tag{12}$$

In this way, when ff=0.5, the focal length obtained by the liquid crystal layer 514 can be changed by at least 0.5%, and thus an effective variable focal-length lens can be realized. Also, the value of $$|n_o' - n_{LC}'|$$

cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197-214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance r becomes at least 70-80% and the liquid crystal can be actually used as a lens, if the liquid crystal satisfies the following condition:

$$D \cdot t \leq \lambda \cdot 15 \; \mu m \tag{13}$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 33 and 35, the transmittance of the liquid crystal layer 514 is improved on an average when the liquid crystal layer 514 satisfies the following equation:

$$n_p = (n_o' + n_{LC}')/2 \tag{14}$$

The variable focal-length lens 511 is used as a lens, and thus in both FIGS. 33 and 35, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \tag{15}$$

When Equation (14) is satisfied, Condition (13) is moderated and it is only necessary to satisfy the following condition:

$$D \cdot t \leq \lambda \cdot 60 \; \mu m \tag{16}$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \; \mu m \cdot (1.585-1.45)^2/(n_u-n_p)^2 \tag{17}$$

where $(n_u-n_p)^2$ is a value when one of $(n_{LC}'-n_p)^2$ and $(n_o'-n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq ff \leq 0.999 \quad (18)$$

On the other hand, the transmittance τ improves as the ratio ff becomes low, and hence Condition (17) may be moderated, preferably, as follows:

$$4 \times 10^{-6} [\mu m]^2 \leq D \cdot t \leq \lambda \cdot 45 \; \mu m \cdot (1.585 - 1.45)^2 / (n_u - n_p)^2 \quad (19)$$

Also, the lower limit of the thickness t, as is obvious from FIG. 33, corresponds to the diameter D, which is at least 2 nm as described above, and therefore the lower limit of D·t becomes $(2 \times 10^{-3} \mu m)^2$, namely $4 \times 10^{-6} [\mu m]^2$.

An approximation where the optical property of substance is represented by the refractive index is established when the diameter D is 5-10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7 \; nm \leq D \leq 500 \lambda \quad (20)$$

Figure 37:
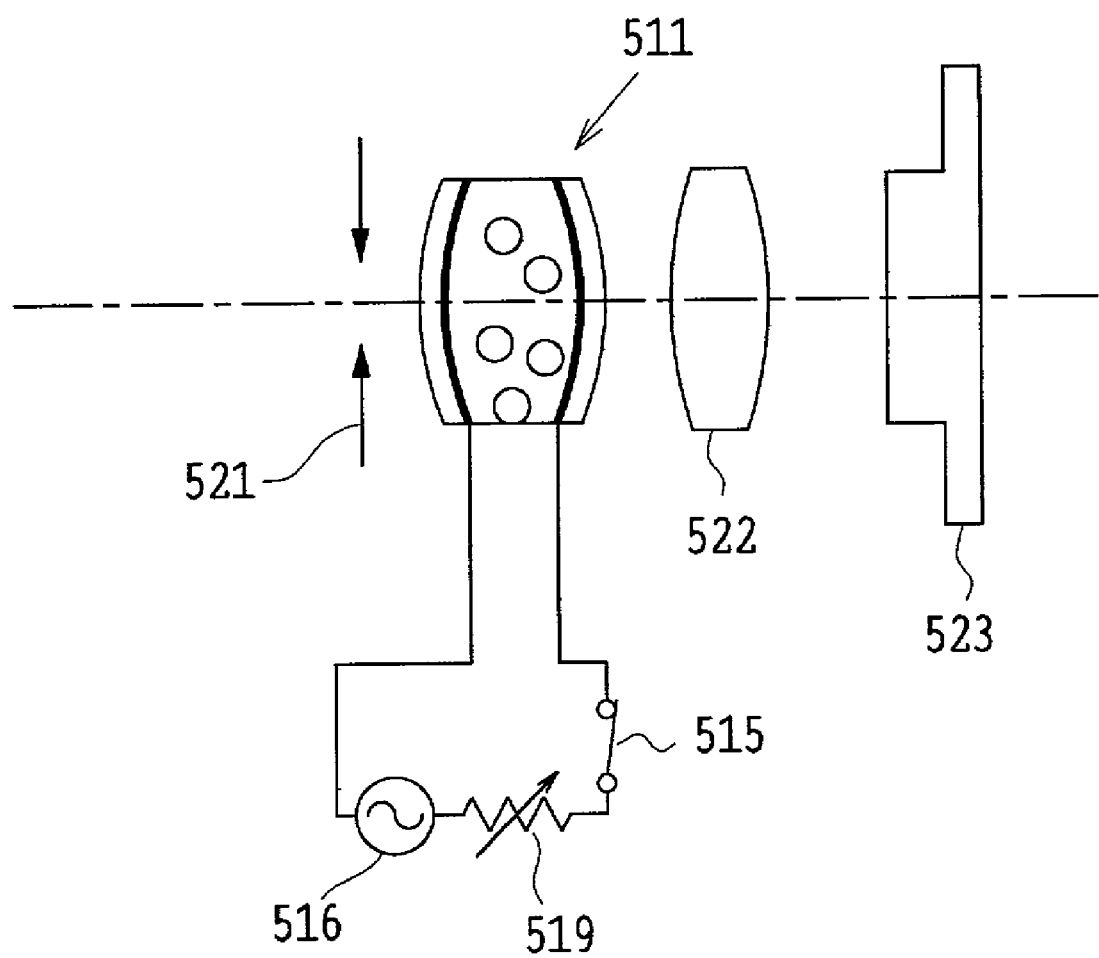
FIG. 37 is a view showing the construction of an imaging optical system for digital cameras which uses the variable focal-length lens, applicable to the shake compensating device of the present invention.

FIG. 37 shows an imaging optical system for digital cameras using the variable focal-length lens 511 of FIG. 36. In this imaging optical system, an image of an object (not shown) is formed on the solid-state image sensor 523, such as a CCD, through a stop 521, the variable focal-length lens 511, and a lens 522. Also, in FIG. 37, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 38:
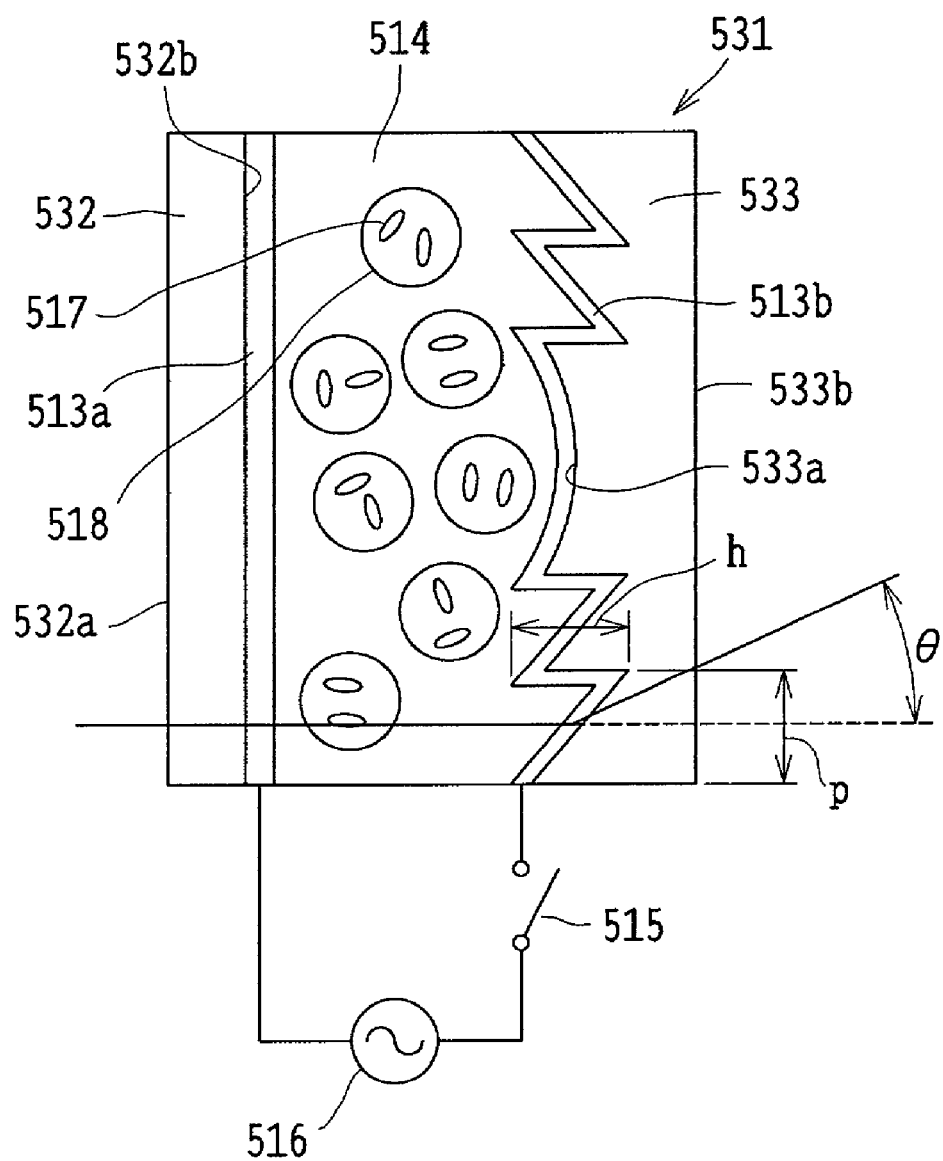
FIG. 38 is a view showing an example of a variable focal-length diffraction optical element applicable to the shake compensating device of the present invention.

FIG. 38 shows one example of a variable focal-length diffraction optical element applicable to the shake compensating device of the present invention. This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 33, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current electric field is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m\lambda \quad (21)$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A - n_{33}) = m\lambda \quad (22)$$

$$h(n_B - n_{33}) = k\lambda \quad (23)$$

Here, the difference in both sides between Equations (22) and (23) is given by $$h(n_A - n_B) = (m-k)\lambda \quad (24)$$

Therefore, when it is assumed that λ=500 nm, $n_A$=1.55, and $n_B$=1.5, $$0.05h = (m-k) \cdot 500 \; nm$$

and when m=1 and k=0, $$h = 10000 \; nm = 10 \; \mu m$$

In this case, the refractive index $n_{33}$ of the transparent substrate 533 is obtained as 1.5 from Equation (22). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In the embodiment, it is only necessary that Equations (22)-(24) are set in practical use to satisfy the following conditions:

$$0.7m\lambda \leq h(n_A - n_{33}) \leq 1.4m\lambda \quad (25)$$

$$0.7k\lambda \leq h(n_A - n_{33}) \leq 1.4k\lambda \quad (26)$$

$$0.7(m-k)\lambda \leq h(n_A - n_B) \leq 1.4(m-k)\lambda \quad (27)$$

Figure 39:
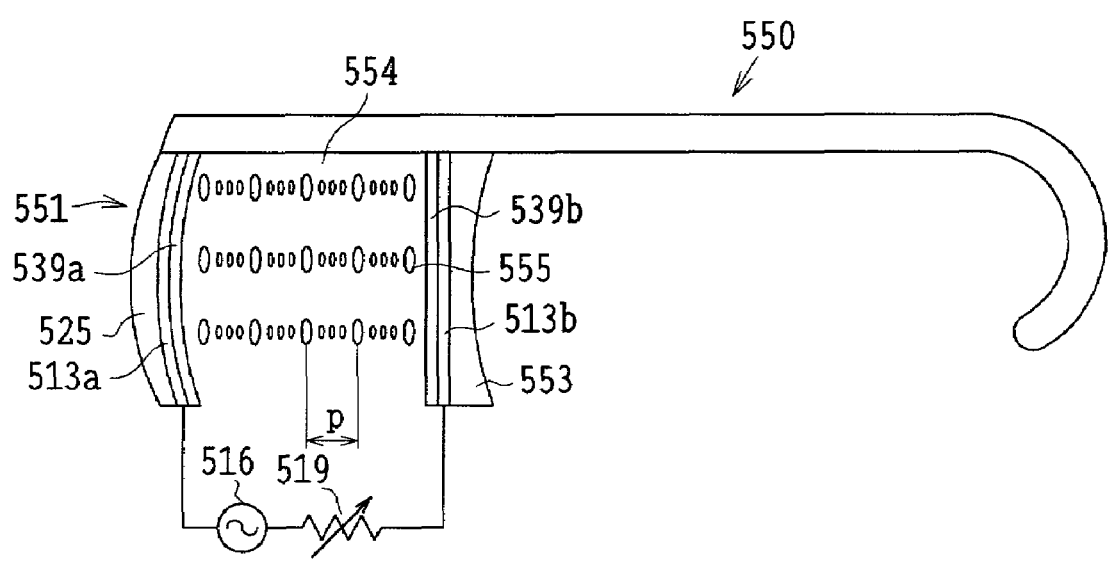
FIG. 39 is a view showing variable focal-length spectacles, each having a variable focal-length lens which uses a twisted nematic liquid crystal, applicable to the shake compensating device of the present invention.
Figure 40:
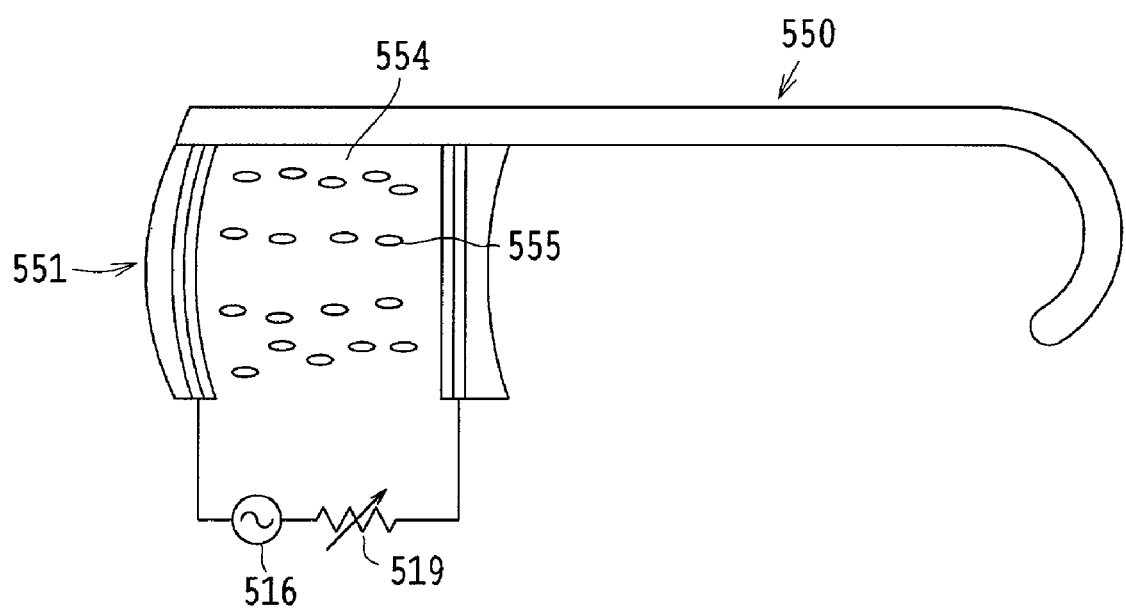
FIG. 40 is a view showing the orientation of liquid crystal molecules where a voltage applied to a twisted nematic liquid crystal layer of FIG. 39 is increased.

A variable focal-length lens using a twisted nematic liquid crystal also falls into the category of the present invention. FIGS. 39 and 40 show variable focal-length spectacles 550 in this case. The variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current electric field is applied to the twisted nematic liquid crystal layer 554.

In this structure, when the voltage applied to the twisted nematic liquid crystal layer 554 is increased, liquid crystal molecules 555, as illustrated in FIG. 40, exhibit a homeotropic orientation, in which the refractive index of the liquid crystal layer 554 is lower and the focal length is longer than in a twisted nematic condition of FIG. 39 in which the applied voltage is low.

A spiral pitch P of the liquid crystal molecules 555 in the twisted nematic condition of FIG. 39 must be made nearly equal to, or much smaller than, the wavelength λ of light, and thus is set to satisfy the following condition:

$$2\text{ nm} \leq P \leq 2\lambda/3 \qquad (28)$$

Also, the lower limit of this condition depends on the sizes of the liquid crystal molecules, while the upper limit is necessary for the behavior of the liquid crystal layer 554 as an isotropic medium under the condition of FIG. 39 when incident light is natural light. If the upper limit of the condition is overstepped, the variable focal-length lens 551 is changed to a lens in which the focal length varies with the direction of deflection. Hence, a double image is formed and only a blurred image is obtained.

Figure 41A:
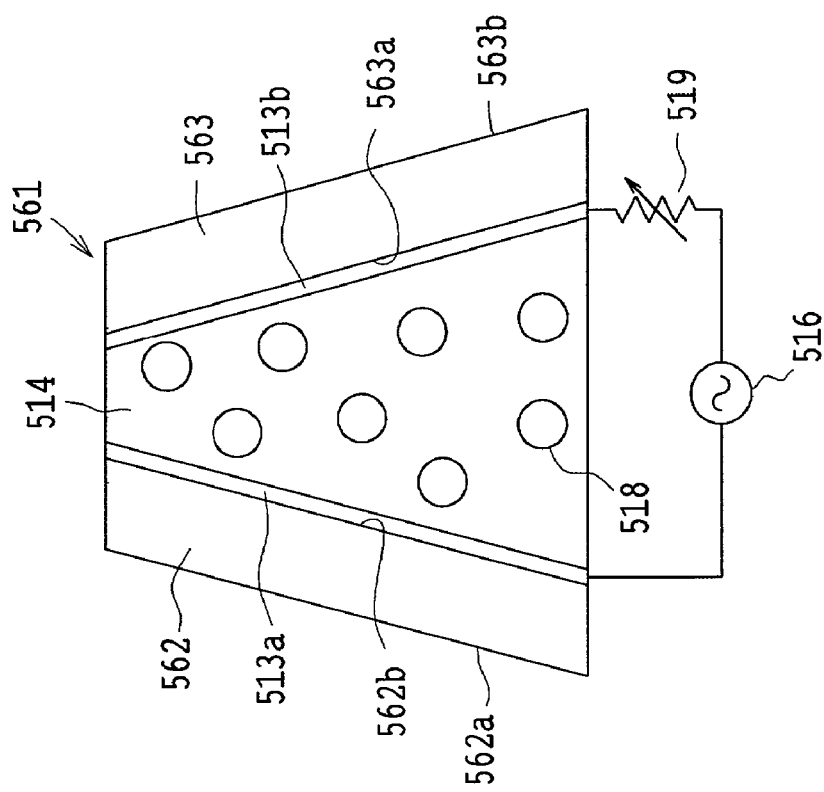
FIG. 41A is a view showing one examples of a variable deflection-angle prism applicable to the shake compensating device of the present invention.
Figure 41B:
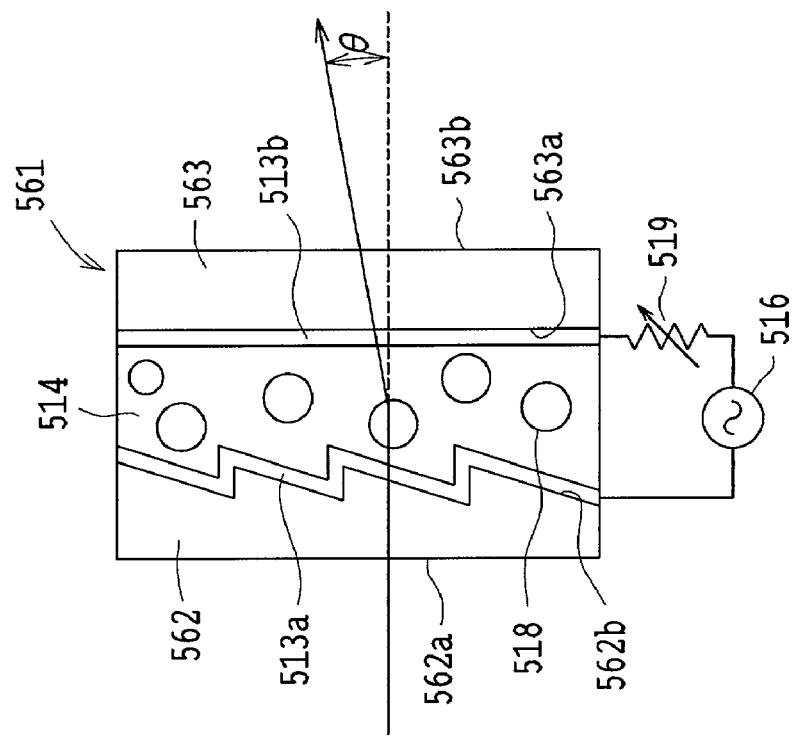
FIG. 41B is a view showing another examples of a variable deflection-angle prism applicable to the shake compensating device of the present invention.

FIG. 41A shows a variable deflection-angle prism applicable to the shake compensating device of the present invention. A variable deflection-angle prism 561 includes a first transparent substrate 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 33, is sandwiched, through the transparent electrodes 513a and 513b, between the transparent substrate 562 and the transparent substrate 563 on the exit side. The transparent electrodes 513a and 513b are connected to the alternating-current power supply 516 through the variable resistor 519. Whereby, the alternating-current electric field is applied to the liquid crystal layer 514 so that the deflection angle of light transmitted through the variable deflection-angle prism 561 is controlled. Also, in FIG. 41A, the inner surface 562b of the transparent substrate 562 is configured into the Fresnel form, but as shown in FIG. 41B, the inner surfaces of the transparent substrates 562 and 563 may be configured like an ordinary prism whose surfaces are relatively inclined, or may be configured like the diffraction grating shown in FIG. 38. In the case of the latter, when Equations (21)-(24) and Conditions (25)-(27) are satisfied, the same description as in the variable focal-length diffraction optical element 531 and the variable focal-length spectacles 550 is applied.

Figure 42:
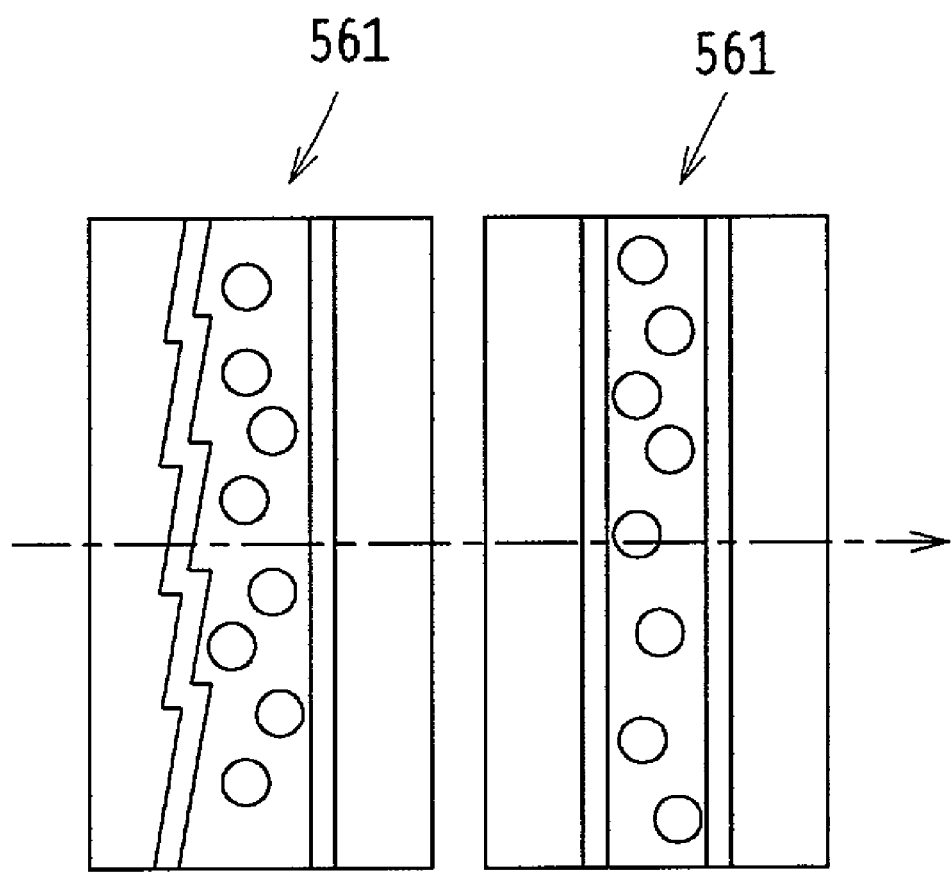
FIG. 42 is a view for explaining the applications of the variable deflection-angle prisms shown in FIGS. 41A and 41B.

The variable deflection-angle prism 561 constructed mentioned above can be effectively used for shake prevention for TV cameras, digital cameras, film cameras, binoculars, etc. In this case, it is desirable that the direction of refraction (deflection) of the variable deflection-angle prism 561 is vertical, but in order to further improve its performance, it is desirable that two variable deflection-angle prisms 561 are arranged so that the directions of deflection are varied and as shown in FIG. 42, the refraction angles are changed in vertical and lateral directions. Also, in FIGS. 41A, 41B, and 42, the liquid crystal molecules are omitted.

Figure 43:
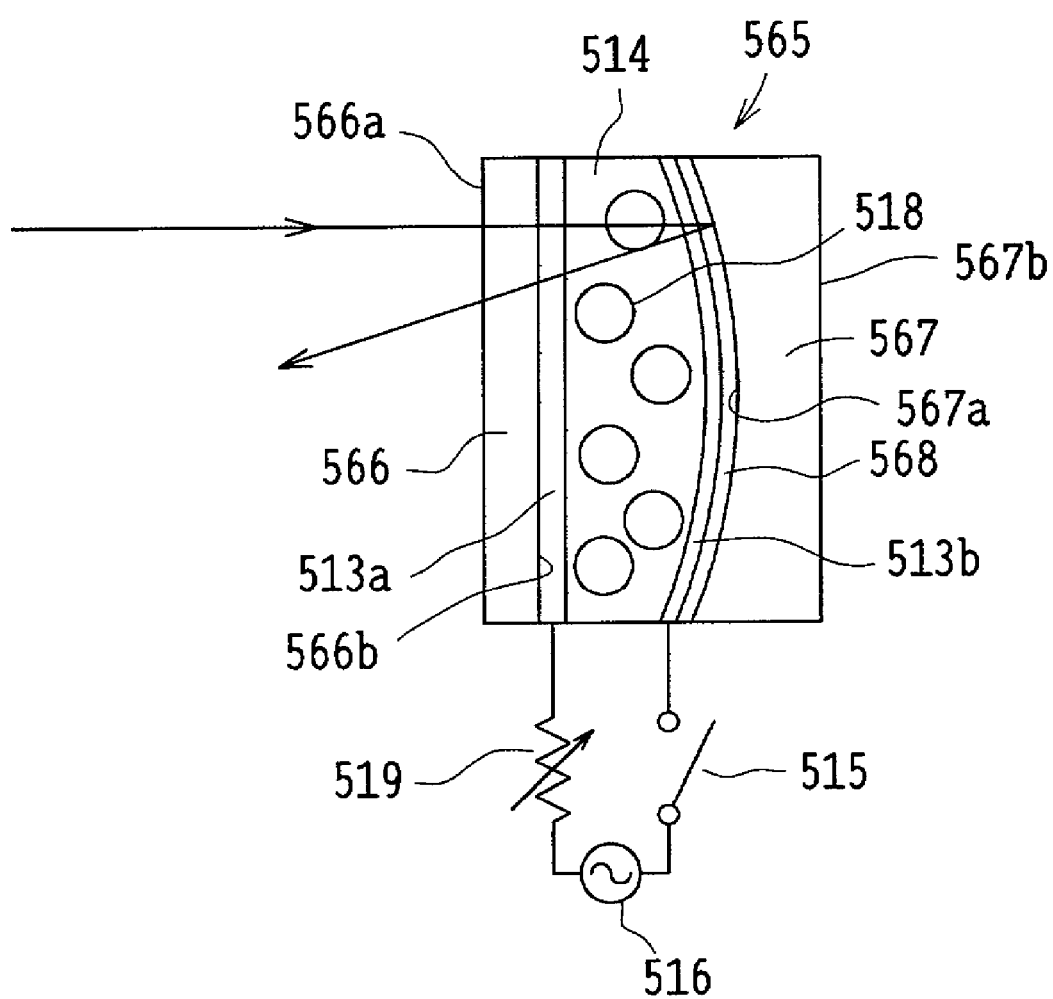
FIG. 43 is a view showing an example of a variable focal-length mirror applying the variable focal-length lens applicable to the shake compensating device of the present invention.

FIG. 43 shows a variable focal-length mirror as the variable focal-length lens applicable to the shake compensating device of the present invention. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited, and the transparent electrode 513b is provided on the reflecting film 568. Between the transparent electrodes 513a and 513b, as in FIG. 33, the macromolecular dispersed liquid crystal layer 514 is sandwiched so that the transparent electrodes 513a and 513b are connected to the alternating-current power supply 516 through the switch 515 and the variable resistor 519, and the alternating-current electric field is applied to the macromolecular dispersed liquid crystal layer 514. Also, in FIG. 43, the liquid crystal molecules are omitted.

According to the above structure, since a ray of light incident on the transparent substrate 566 is passed again through the liquid crystal layer 514 by the reflecting film 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, Conditions mentioned above can be used. Moreover, the inner surface of the transparent substrate 566 or 567, as shown in FIG. 38, can also be configured into the diffraction grating shape to reduce the thickness of the liquid crystal layer 514. By doing so, the amount of scattered light can be decreased.

Figure 44:
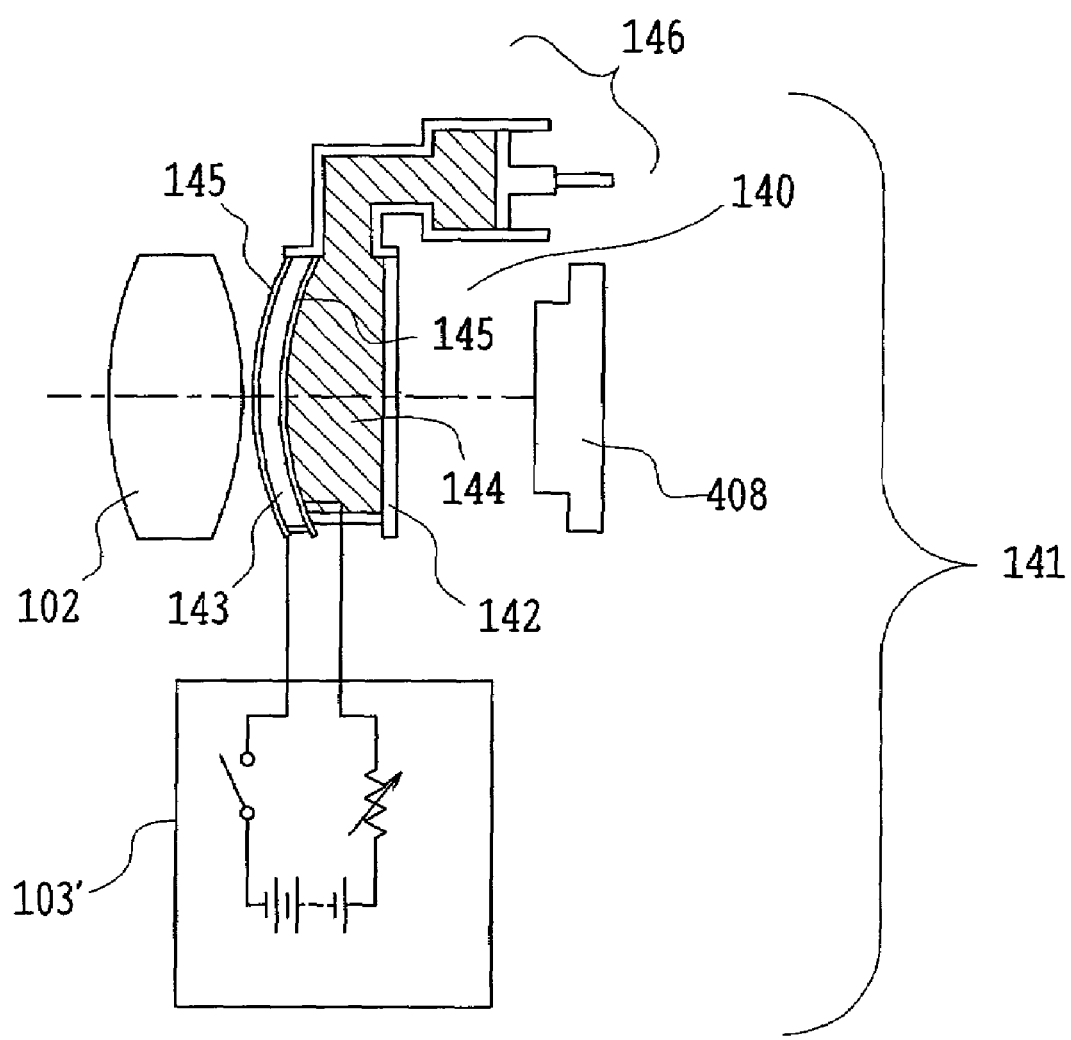
FIG. 44 is a view showing schematically an imaging unit using the variable focal-length lens applicable to the shake compensating device of the present invention.

In the above description, in order to prevent the deterioration of the liquid crystal, the alternating-current power supply 516 is used as a voltage source to apply the alternating-current electric field to the liquid crystal. However, a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 512a and 512b, the transparent substrate 532, the lens 522, one of the lenses 552 and 553, the transparent substrate 563 of FIG. 41A, or one of the transparent substrates 562 and 563 of FIG. 41B, may be eliminated. FIG. 44 shows an imaging unit 141 using a variable focal-length lens 140, in another embodiment, applicable to the shake compensating device of the present invention. The imaging unit 141 can be used as the imaging system of the present invention.

In this embodiment, the lens 102 and the variable focal-length lens 140 constitute an imaging lens system, and the imaging lens system and the solid-state image sensor 408 constitute the imaging unit 141. The variable focal-length lens 140 is constructed with a light-transmitting fluid or jelly-like substance 144 sandwiched between a transparent member 142 and a soft transparent substance 143 such as piezoelectric synthetic resin.

As the fluid or jelly-like substance 144, silicon oil, elastic rubber, jelly, or water can be used. Transparent electrodes 145 are provided on both surfaces of the transparent substance 143, and when the voltage is applied through a circuit 103', the transparent substance 143 is deformed by the piezoelectric effect of the transparent substance 143 so that the focal length of the variable focal-length lens 140 is changed.

Thus, according to the embodiment, even when the object distance is changed, focusing can be performed without moving the optical system with a motor, and as such the embodiment excels in compact and lightweight design and low power consumption.

In FIG. 44, reference numeral 146 denotes a cylinder for storing a fluid. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the surface of the deformable mirror, which is favorable.

It is good practice to use a transparent piezoelectric substance for the variable focal-length lens.

Figure 45:
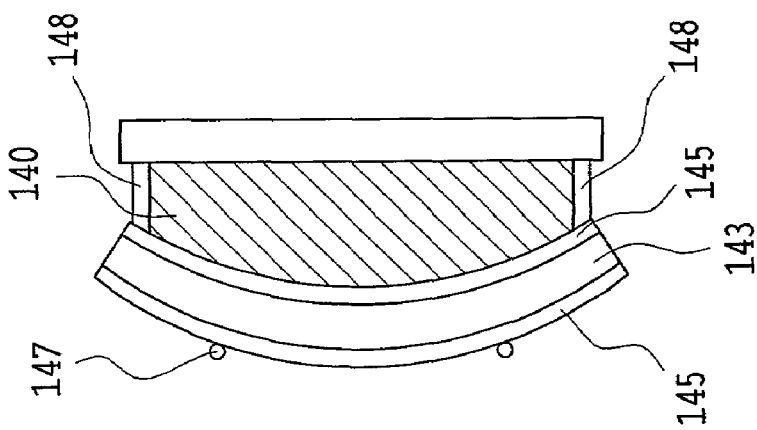
FIG. 45 is an explanatory view showing a modified example of the variable focal-length lens of FIG. 44.

In FIG. 44, instead of using the cylinder 146, the variable focal-length lens 140, as shown in FIG. 45, may be designed to use supporting members 147.

Figure 46:
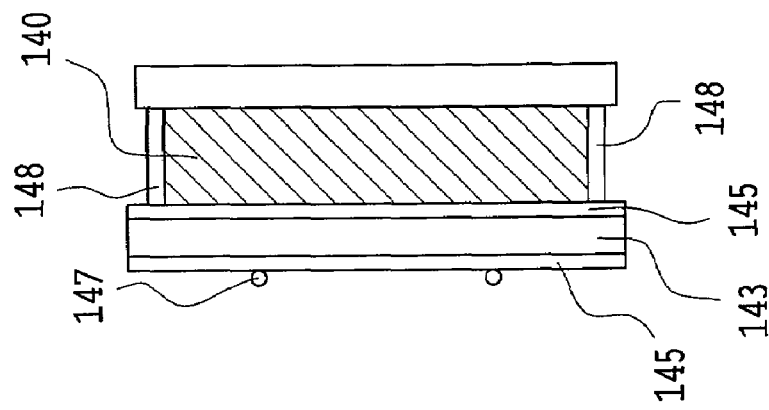
FIG. 46 is an explanatory view showing a state where the variable focal-length lens of FIG. 45 is deformed.

The supporting members 147 are designed to fix the periphery of a part of the transparent substance 143 sandwiched between the transparent electrodes 145. According to the embodiment, even when the voltage is applied to the transparent substance 143 and thereby the transparent substance 143 is deformed, as shown in FIG. 46, the volume of the entire variable focal-length lens 140 remains unchanged. As such, the cylinder 146 becomes unnecessary. Also, in FIGS. 45 and 46, reference numeral 148 designates a deformable member, which is made with an elastic body, accordion-shaped synthetic resin, or metal.

In each of the examples shown in FIGS. 44 and 45, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 47:
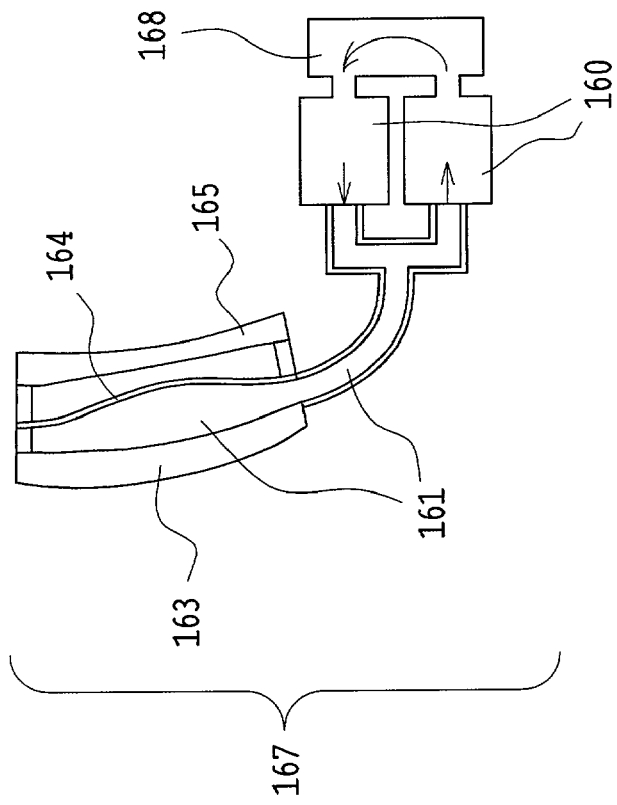
FIG. 47 is a view showing schematically another example of the variable focal-length lens applicable to the shake compensating device of the present invention.

FIG. 47 shows a variable focal-length lens 167 in which the fluid 161 is taken in and out by a micropump 160 to deform the lens surface, in another embodiment of the variable focal-length lens applicable to the camera of the present invention.

The micropump 160 is a small-sized pump, for example, made by a micromachining technique and is constructed so that it is operated with an electric power. The fluid 161 is sandwiched between a transparent substrate 163 and an elastic body 164. In FIG. 47, reference numeral 165 represents a transparent substrate for protecting the elastic body 164 and this substrate is not necessarily required.

As examples of pumps made by the micromachining technique, there are those which use thermal deformations, piezoelectric substances, and electrostatic forces.

It is also possible to use the micropump 180 shown in FIG. 32 as two micropumps, for example, as in the micropump 160 used in the variable focal-length lens 167 of FIG. 47.

In the variable focal-length lens which uses the electrostatic force or the piezoelectric effect, a high voltage is sometimes required for drive. In this case, it is desirable that the boosting transformer or the piezoelectric transformer is used to constitute the control system.

When a laminated piezoelectric transformer is particularly used, a compact design is achieved.

Figure 48:
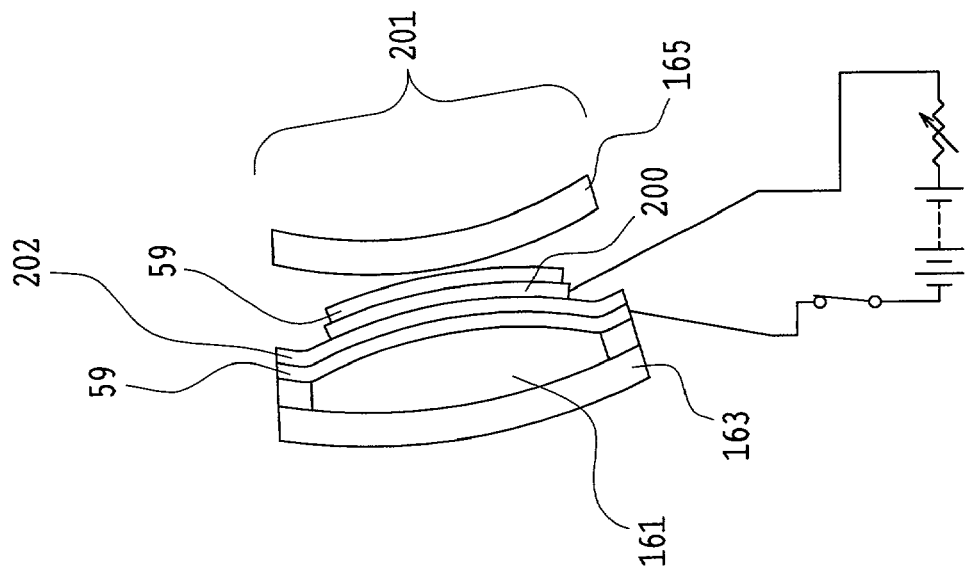
FIG. 48 is a view showing schematically another example of the variable focal-length lens applicable to the shake compensating device of the present invention.

FIG. 48 shows a variable focal-length lens 201 using a piezoelectric substance 200 in another embodiment of a variable optical-property element applicable to the shake compensating device of the present invention.

The same substance as the transparent substance 143 is used for the piezoelectric substance 200, which is provided on a soft transparent substrate 202. It is desirable that synthetic resin or an organic substance is used for the substrate 202.

In this embodiment, the voltage is applied to the piezoelectric substance 200 through the two transparent electrodes 59, and thereby the piezoelectric substance 200 is deformed so that the function of a convex lens is exercised in FIG. 48.

Figure 49:
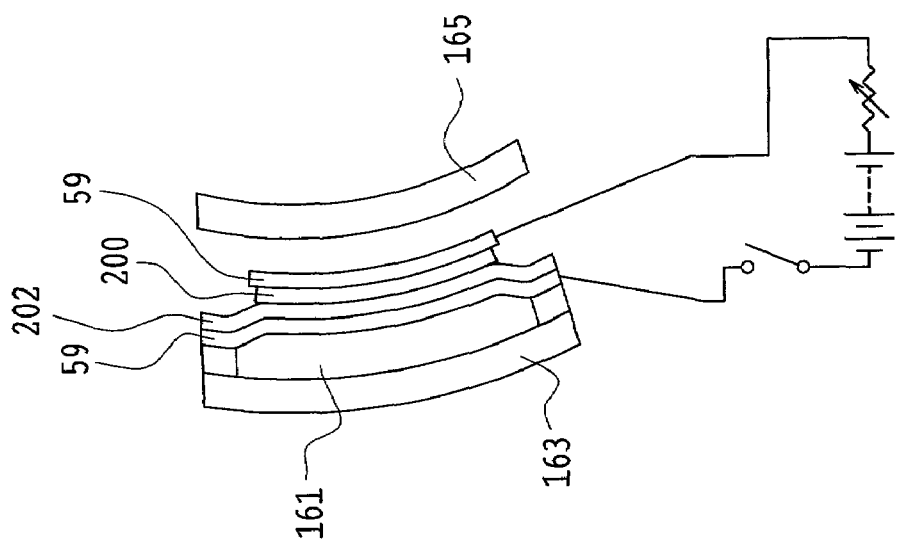
FIG. 49 is an explanatory view showing a state where the variable focal-length lens of FIG. 48 is deformed.

The substrate 202 is previously configured into a convex form, and at least one of the two transparent electrodes 59 is caused to differ in size from the substrate 202, for example, one of the electrodes 59 is made smaller than the substrate 202. In doing so, when the applied voltage is removed, the opposite, preset portions of the two transparent electrodes 59, as shown in FIG. 49, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

This embodiment has a great merit that a part of the substrate holding the fluid 161 is deformed by the piezoelectric substance and the liquid tank 168 is dispensed with.

The transparent substrates 163 and 165 may be constructed with lenses or plane surfaces, and the same may be said of the embodiment of FIG. 47.

Figure 50:
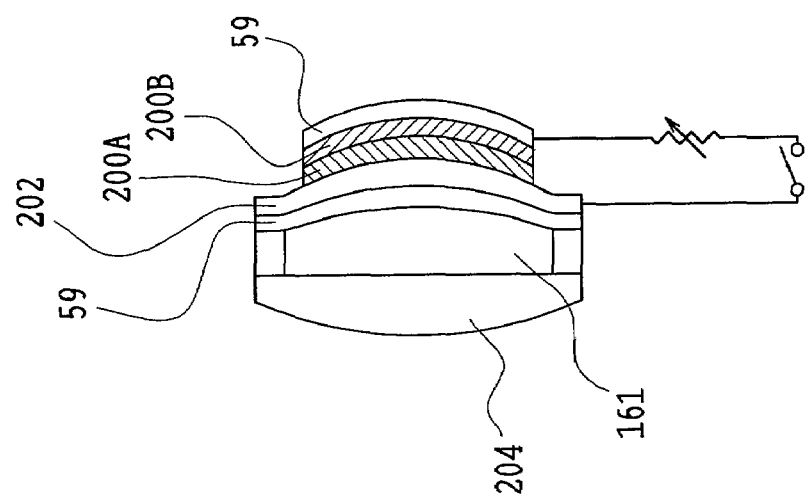
FIG. 50 is a view showing schematically another example of the variable focal-length lens applicable to the shake compensating device of the present invention.

FIG. 50 shows a variable focal-length lens using two thin plates 200A and 200B constructed of piezoelectric substances in still another embodiment of the variable optical-property element applicable to the shake compensating device of the present invention.

The variable focal-length lens of this embodiment has the merit that the thin plate 200A is reversed in direction of the substance with respect to the thin plate 200B, and thereby the amount of deformation is increased so that a wide variable focal-length range can be obtained.

Also, in FIG. 50, reference numeral 204 denotes a lens-shaped transparent substrate.

Even in the embodiment, the transparent electrode 59 on the right side of the figure is configured to be smaller than the substrate 202.

In the embodiments of FIGS. 48-50, the thicknesses of the substrate 202, the piezoelectric substance 200, and the thin plates 200A and 200B may be rendered uneven so that a state of deformation caused by the application of the voltage is controlled.

By doing so, lens aberration can be corrected, which is convenient.

Figure 51:
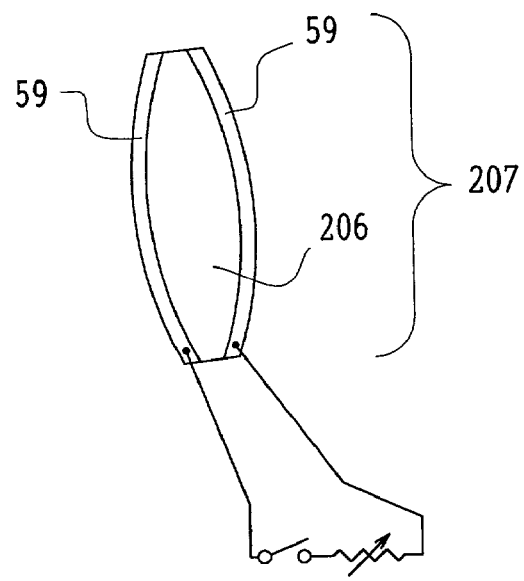
FIG. 51 is a view showing schematically another example of the variable focal-length lens applicable to the shake compensating device of the present invention.

FIG. 51 shows another embodiment of the variable focal-length lens applicable to the shake compensating device of the present invention.

A variable focal-length lens 207 of this embodiment uses an electrostrictive substance 206 such as silicon rubber or acrylic elastomer.

Figure 52:
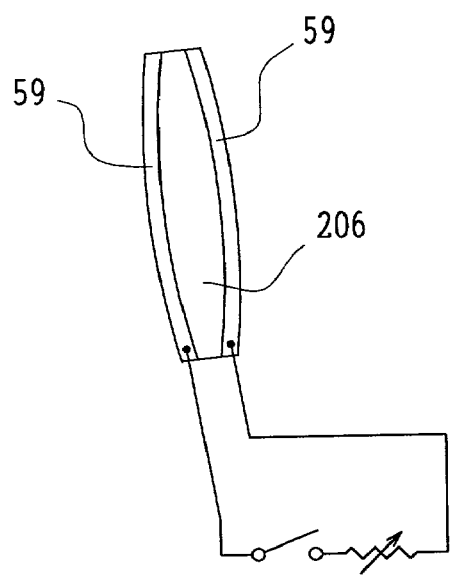
FIG. 52 is an explanatory view showing a state of the deformation of the variable focal-length lens in FIG. 51.

According to the embodiment, when the voltage is low, the electrostrictive substance 206, as depicted in FIG. 51, acts as a convex lens, while when the voltage is increased, the electrostrictive substance 206, as depicted in FIG. 52, expands in a vertical direction and contracts in a lateral direction, and thus the focal length is increased. In this way, the electrostrictive substance 206 operates as the variable focal-length lens.

According to the variable focal-length lens of the embodiment, there is the merit that since a large power supply is not required, power consumption is minimized.

Figure 53:
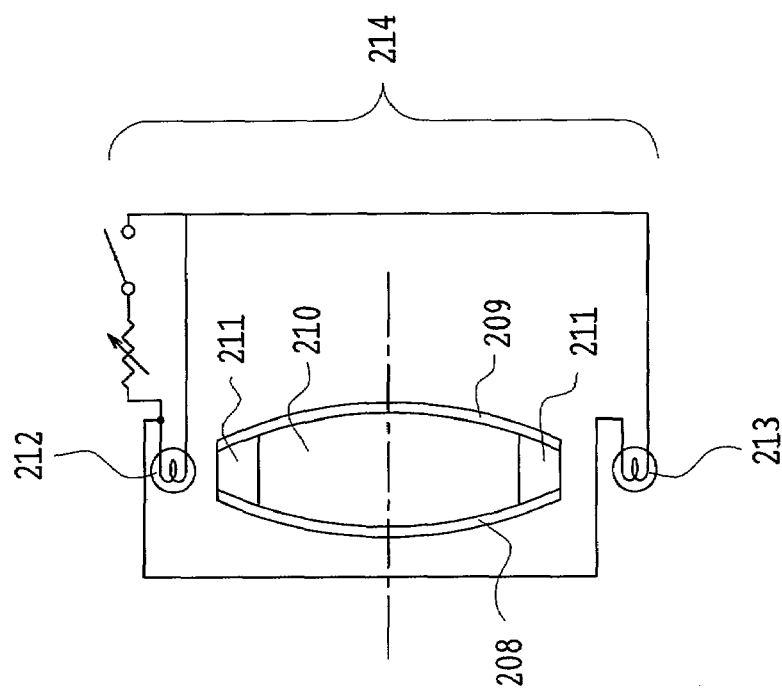
FIG. 53 is a view showing schematically another example of the variable focal-length lens applicable to the shake compensating device of the present invention.

FIG. 53 shows a variable focal-length lens using a photonical effect in a further embodiment of the variable optical-property element applicable to the shake compensating device of the present invention.

A variable focal-length lens 214 of this embodiment is designed so that azobenzene 210 is sandwiched between transparent elastic bodies 208 and 209 and is irradiated with ultraviolet light through a transparent spacer 211.

In FIG. 53, reference numerals 212 and 213 represent ultraviolet light sources, such as ultraviolet LEDs or ultraviolet semiconductor lasers, of central wavelengths $\lambda_1$ and $\lambda_2$, respectively.

Figure 54B:
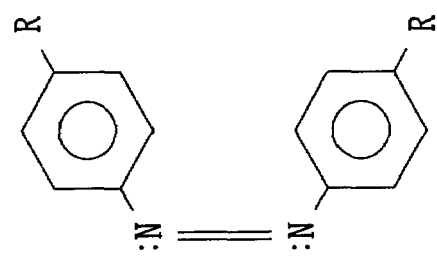
FIG. 54B is an explanatory view showing the structure of azobenzene of cis-type used in the variable focal-length lens of the embodiment of FIG. 53.
Figure 54A:
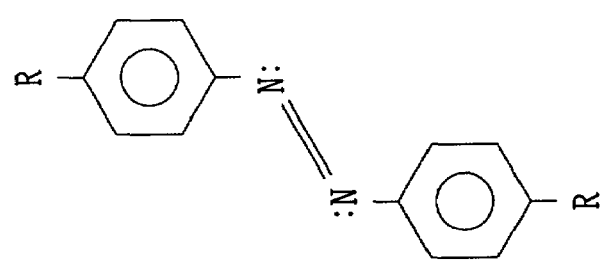
FIG. 54A is an explanatory view showing the structure of azobenzene of trans-type used in the variable focal-length lens of the embodiment of FIG. 53.

In the embodiment, when trans-type azobenzene shown in FIG. 54A is irradiated with ultraviolet light of the central wavelength $\lambda_1$, the azobenzene 210 changes to cis-type azobenzene shown in FIG. 54B to reduce its volume. Consequently, the thickness of the variable focal-length lens 214 is decreased, and the function of the convex lens is impaired.

On the other hand, when the cis-type azobenzene is irradiated with ultraviolet light of the central wavelength $\lambda_2$, the azobenzene 210 changes to the trans-type azobenzene to increase the volume. Consequently, the thickness of the variable focal-length lens 214 is increased, and the function of the convex lens is improved.

In this way, the optical element of the embodiment acts as the variable focal-length lens. In the variable focal-length lens 214, since the ultraviolet light is totally reflected at the interface between each of the transparent elastic bodies 208 and 209 and air, the light does not leak through the exterior and high efficiency is obtained.

In the variable focal-length lens of each of the embodiments mentioned above, each of the transparent electrodes 145, 59, 508*a*, 509*a*, 513*a*, and 513*b* may be divided into a plurality of segments. By applying different voltages to individual divided transparent electrodes, it becomes possible to carry out not only the focusing, zoom, and magnification change of the optical apparatus, but also shake compensation, compensation for degradation of optical performance by manufacturing errors, and correction for aberration.

Subsequently, a description will be given of examples of various division patterns of the transparent electrode used in the variable focal-length lens applicable to the shake compensating device of the present invention, with reference to FIGS. 55-58.

Figure 55:
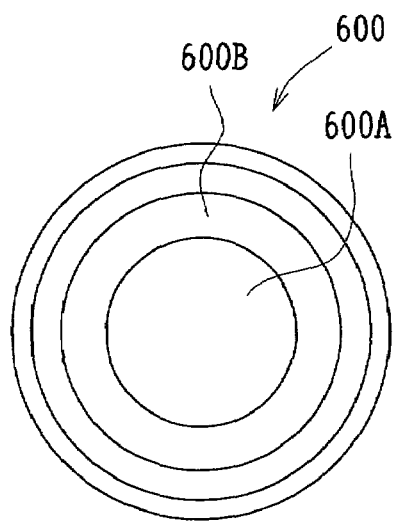
FIG. 55 is an explanatory view showing an example of a transparent electrode used in the variable focal-length lens applicable to the shake compensating device of the present invention.

FIG. 55 shows an example where a transparent electrode 600 is concentrically divided. A zone narrows progressively in going from the center to the periphery. It is for this reason that correction for aberration is facilitated.

Figure 56:
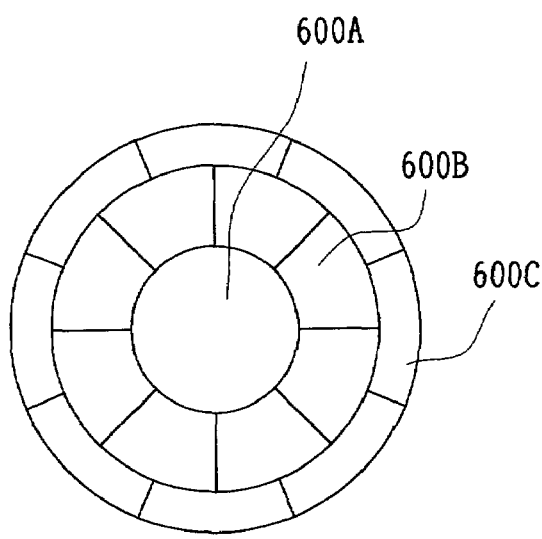
FIG. 56 is an explanatory view showing another example of a transparent electrode used in the variable focal-length lens applicable to the shake compensating device of the present invention.

In FIG. 56, each zone is further divided so that three boundaries of the electrodes are converged. By doing so, the shape of the piezoelectric substance 200 is smoothly changed, and hence a lens with less aberration is obtained.

Figure 57:
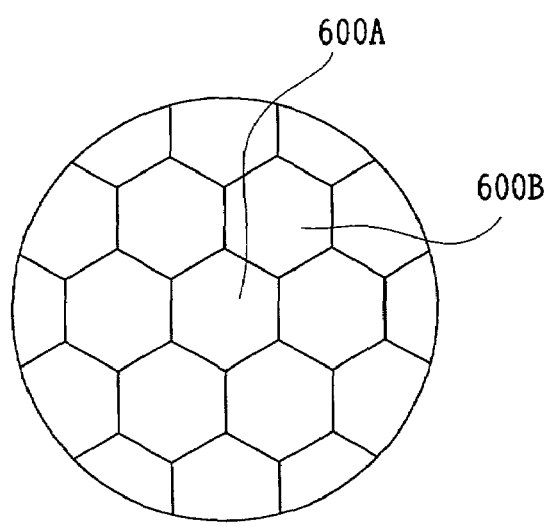
FIG. 57 is an explanatory view showing still another example of a transparent electrode used in the variable focal-length lens applicable to the shake compensating device of the present invention.

In FIG. 57, the transparent electrode 600 is divided into hexagons so that, for the same reason as in the above description, three boundaries of the electrodes are converged.

It is advantageous for correction for aberration that individual divided electrodes 600A, 600B, 600C, . . . in FIGS. 56 and 57 have almost the same area. Thus, it is desirable that an area ratio of an electrode with the largest area to an electrode with the smallest area, of the divided electrodes, is set within 100:1.

The divided electrodes, as in FIGS. 55-57, are arrayed so that the central electrode 600A is surrounded by others. In a circular lens, this is particularly advantageous for correction for aberration. The boundaries of the transparent electrodes which are converged may be set so that mutual angles are larger than 90°.

Figure 58:
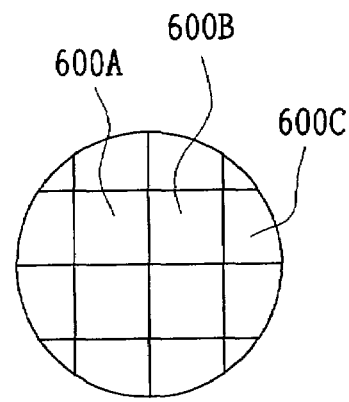
FIG. 58 is an explanatory view showing a further example of a transparent electrode used in the variable focal-length lens applicable to the shake compensating device of the present invention.

Also, as shown in FIG. 58, the electrode may be divided into lattice-like segments. Such a division pattern has the merit that fabrication is easy.

In order to completely correct aberration or the shake of the optical system, it is desirable that the number of divided electrodes is as large as possible. At least 7 divided electrodes are required to correct second-order aberration; at least 9 divided electrodes to correct third-order aberration; at least 13 divided electrodes to correct fourth-order aberration; at least 16 divided electrodes to correct fifth-order aberration; and at least 25 divided electrodes to correct seventh-order aberration. Also, the second-order aberration refers to components in the x and y directions of tilt, astigmatism, and coma. However, if at least 3 divided electrodes are available for a low-cost product, considerable aberration or a sharp shake can be corrected.

Figure 59:
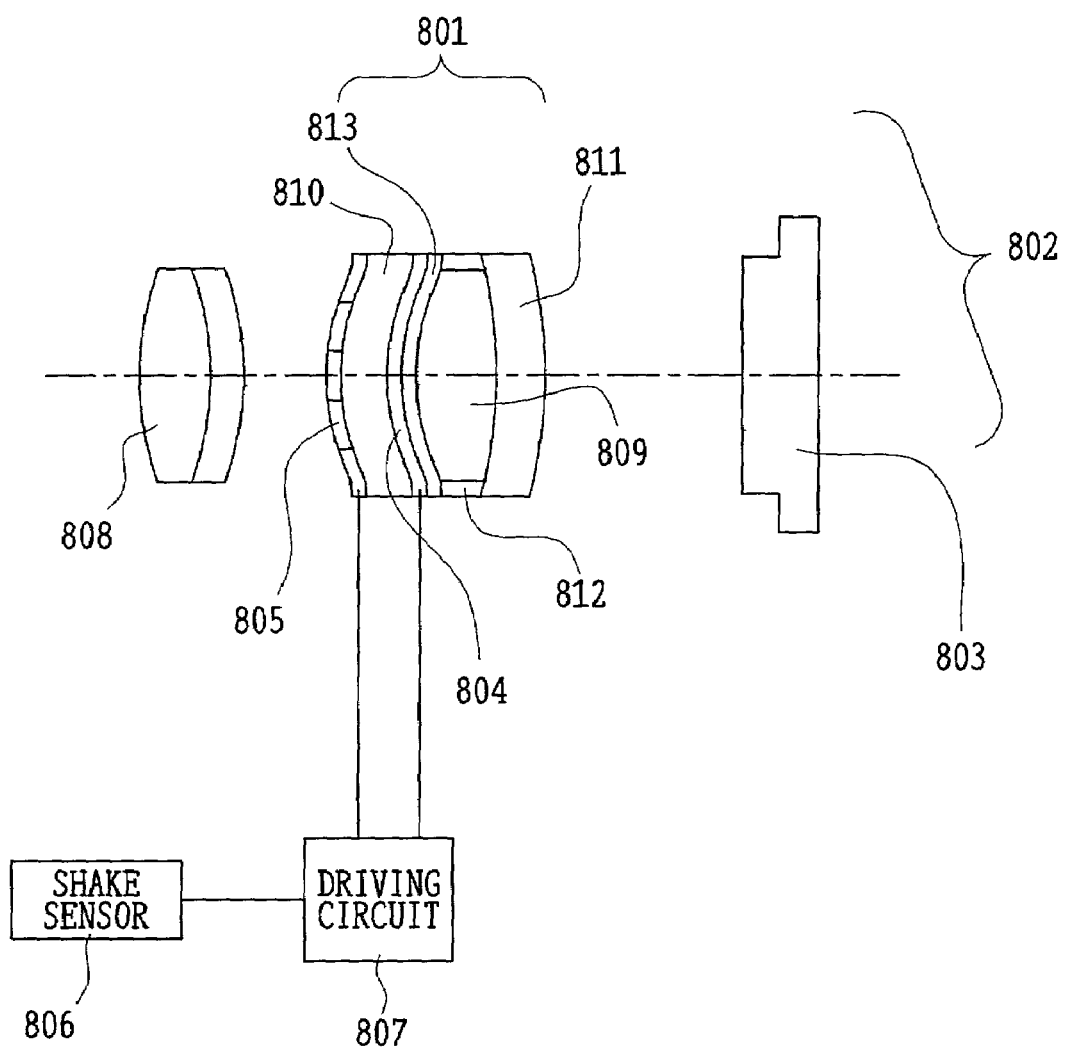
FIG. 59 is a view showing a schematic construction of an example of a digital camera to which the shake compensating device of the present invention is applicable.

FIG. 59 shows a schematic structure of the shake compensating device for a digital camera using a variable focal-length lens 801 made of an electrostrictive substance in another embodiment of the shake compensating device of the present invention.

A shake compensating device 802 of this embodiment includes the variable focal-length lens 801 interposed between a lens 808 and a solid-state image sensor 803, a driving circuit 807, and a shake sensor 806.

The variable focal-length lens 801 has a first electrode 804 and a second electrode 805 divided into a plurality of transparent segments, between which an electrostrictive substance 810 is sandwiched. The variable focal-length lens 801 further has a deformable transparent member 813, a fluid 809 sealed by a seal member 812, and a transparent substrate 811. The first electrode 804 and the second electrode 805 are constructed to be deformable and the driving circuit 807 is driven by a signal from the shake sensor 806 so that different voltages are applied across the first electrode 804 and the second electrode 805 divided into the plurality of segments to impart a prism function to the variable focal-length lens 801, and thereby the shake can be compensated.

According to the shake compensating device using the variable focal-length lens of the embodiment, the voltages applied to the second electrode 805 are changed, and thereby the variable focal-length lens 801 is capable of making compensation for fluctuations of aberrations involved in focusing, zooming, correction for aberration, and compensation for shake, as well as compensation for shake.

The shake compensating device of the present invention is applicable to any of electronic cameras such as a digital camera, a camcorder, and a TV camera.

Also, although reference has been made to the shake compensating device in hand-held use of the digital camera, the present invention is not limited to this and can be used in various optical devices, imaging device, and observation devices as compensation for shakes of binoculars, a telescope used for observation on a ship, and the TV camera.

In the embodiments of the present invention, the examples where the shake compensating device is applied to the electronic camera has been described, it can, of course, be applied to the conventional camera in which the object image is exposed to a silver-halide film.

Finally, the definitions of terms employed in the present invention will be described.

An optical apparatus used in the present invention refers to an apparatus including an optical system or optical elements. The optical apparatus need not necessarily function by itself. That is, it may be thought of as a part of an apparatus. The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

The extended surface is defined as follows:

Each of the surfaces of lenses, prisms, and mirrors need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory.

In the present invention, it is assumed that such a surface is generally referred as to the extended surface.

The variable optical-property element includes a variable focal-length lens, a deformable mirror, a deflection prism whose surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a cellular phone; a stationary phone; a remote control for game machines, TVs, radio-cassette tape recorders, or stereo sound systems; a personal computer; or a keyboard, mouse, or touch panel for personal computers.

OIt also includes a TV monitor with the imaging device, or a monitor or display for personal computers.

The information transmitter is included in the signal processing device.

According to the present invention, the deformable mirror can be controlled by a small number of external lead electrodes. Furthermore, the tilt of the reflecting mirror can be controlled in a non-contact condition by the electrostatic force, and thus the shake of the camera in hand-held use can be compensated with a simple structure and without deteriorating image quality.

What is claimed is:

1. A shake compensating device for a camera comprising:
   a photographic lens for forming an image of an object;
   a reflecting surface placed at an angle with an optical axis of the photographic lens on an object side in reference to the photographic lens, thereby reflecting light to the photographic lens;
   a first substrate having a first electrode, parallel to the reflecting surface;
   a second substrate fixed to a camera body, placed opposite to the first substrate and having a second electrode at a position opposite to the first electrode;
   resilient members supporting the first substrate to the second substrate, displaceable in a vertical direction of the second substrate;
   a voltage control circuit for applying voltages across a plurality of electrode segments into which one of the first electrode and the second electrode is segmented and a remaining electrode opposite to the electrode segments; and
   a detecting device for detecting a shake angle of the camera,
   the voltage control circuit controlling the voltages applied across the electrode segments and the remaining electrode opposite to the electrode segments in accordance with an output of the detecting device,
   wherein one of the first electrode and the second electrode, segmented into the plurality of electrode segments, has a first pair of electrode segments symmetrical with respect to a first plane passing through an optical axis of the photographic lens and normal to the reflecting surface and a second pair of electrode segments symmetrical with respect to a second plane normal to the first plane and passing through a point of intersection of the optical axis of the photographic lens and the reflecting surface, and the voltage control circuit controls a tilt of the reflecting surface in a first direction by a difference between voltages applied across the remaining electrode, which is nonsegmented, of the first electrode and the second electrode and the first pair of electrode segments and in a second direction by a difference between voltages applied across the remaining electrode which is nonsegmented and the second pair of electrode segments.

2. A shake compensating device for an electronic imaging apparatus, comprising:
   a photographic lens for forming an image of an object;
   a reflecting surface placed at an angle with an optical axis of the photographic lens on an object side in reference to the photographic lens, thereby reflecting light to the photographic lens;
   a first substrate having a first electrode, parallel to the reflecting surface;
   a second substrate fixed to a body of the electronic imaging apparatus, placed opposite to the first substrate and having a second electrode at a position opposite to the first electrode;
   resilient members supporting the first substrate to the second substrate, displaceable in a vertical direction of the second substrate;
   a voltage control circuit for applying voltages across a plurality of electrode segments into which one of the first electrode and the second electrode is segmented and a remaining electrode opposite to the electrode segments; and a detecting device for detecting a shake angle of the electronic imaging apparatus, the voltage control circuit controlling the voltages applied across the electrode segments and the remaining electrode opposite to the electrode segments in accordance with an output of the detecting device, wherein one of the first electrode and the second electrode, segmented into the plurality of electrode segments, has a first pair of electrode segments symmetrical with respect to a first plane passing through an optical axis of the photographic lens and normal to the reflecting surface and a second pair of electrode segments symmetrical with respect to a second plane normal to the first plane and passing through a point of intersection of the optical axis of the photographic lens and the reflecting surface, and the voltage control circuit controls a tilt of the reflecting surface in a first direction by a difference between voltages applied across the remaining electrode, which is nonsegmented, of the first electrode and the second electrode and the first pair of electrode segments and in a second direction by a difference between voltages applied across the remaining electrode which is nonsegmented and the second pair of electrode segments.

3. A shake compensating device for an electronic imaging apparatus, comprising:

a photographic lens for forming an image of an object;

a reflecting surface placed at an angle with an optical axis of the photographic lens on an object side in reference to the photographic lens, thereby reflecting light to the photographic lens;

a first substrate having a first electrode, parallel to the reflecting surface;

a second substrate fixed to a body of the electronic imaging apparatus, placed opposite to the first substrate and having a second electrode at a position opposite to the first electrode;

a voltage control circuit for applying voltages across a plurality of electrode segments into which one of the first electrode and the second electrode is segmented and a remaining electrode opposite to the electrode segments; and a detecting device for detecting a shake angle of the electronic imaging apparatus, the voltage control circuit controlling the voltages applied across the electrode segments and the remaining electrode opposite to the electrode segments in accordance with an output of the detecting device, wherein one of the first electrode and the second electrode, segmented into the plurality of electrode segments, has a first pair of electrode segments symmetrical with respect to a first plane passing through an optical axis of the photographic lens and normal to the reflecting surface and a second pair of electrode segments symmetrical with respect to a second plane normal to the first plane and passing through a point of intersection of the optical axis of the photographic lens and the reflecting surface, and the voltage control circuit controls a tilt of the reflecting surface in a first direction by a difference between voltages applied across the remaining electrode, which is nonsegmented, of the first electrode and the second electrode and the first pair of electrode segments and in a second direction by a difference between voltages applied across the remaining electrode which is nonsegmented and the second pair of electrode segments.

4. A shake compensating device for a digital camera, comprising:

a photographic lens for forming an image of an object;

a reflecting surface placed at an angle with an optical axis of the photographic lens on an object side in reference to the photographic lens, thereby reflecting light to the photographic lens;

a first substrate having a first electrode, parallel to the reflecting surface;

a second substrate fixed to a body of the digital camera, placed opposite to the first substrate and having a second electrode at a position opposite to the first electrode;

resilient members supporting the first substrate to the second substrate, displaceable in a vertical direction of the second substrate;

a voltage control circuit for applying voltages across a plurality of electrode segments into which one of the first electrode and the second electrode is segmented and a remaining electrode opposite to the electrode segments; and a detecting device for detecting a shake angle of the digital camera, the voltage control circuit controlling the voltages applied across the electrode segments and the remaining electrode opposite to the electrode segments in accordance with an output of the detecting device, wherein one of the first electrode and the second electrode, segmented into the plurality of electrode segments, has a first pair of electrode segments symmetrical with respect to a first plane passing through an optical axis of the photographic lens and normal to the reflecting surface and a second pair of electrode segments symmetrical with respect to a second plane normal to the first plane and passing through a point of intersection of the optical axis of the photographic lens and the reflecting surface, and the voltage control circuit controls a tilt of the reflecting surface in a first direction by a difference between voltages applied across the remaining electrode, which is nonsegmented, of the first electrode and the second electrode and the first pair of electrode segments and in a second direction by a difference between voltages applied across the remaining electrode which is nonsegmented and the second pair of electrode segments.

* * * * *